United States Patent [19]
Kato

[11] Patent Number: 6,044,707
[45] Date of Patent: Apr. 4, 2000

[54] ANGULAR RATE SENSOR

[75] Inventor: Manabu Kato, Aichi-ken, Japan

[73] Assignee: Aisin Seiki Kabushiki Kaisha, Kariya, Japan

[21] Appl. No.: 09/100,888

[22] Filed: Jun. 22, 1998

[30] Foreign Application Priority Data

Jun. 20, 1997 [JP] Japan .................................. 09-163851
Jul. 29, 1997 [JP] Japan .................................. 09-203560
Sep. 10, 1997 [JP] Japan .................................. 09-245725

[51] Int. Cl.$^7$ ..................................................... G01P 9/04
[52] U.S. Cl. ..................... 73/504.14; 73/504.02; 73/504.12
[58] Field of Search ........................... 73/504.02, 504.03, 73/504.04, 504.12, 504.14, 504.15, 504.16

[56] References Cited

U.S. PATENT DOCUMENTS 5,604,312  2/1997  Lutz ..................................... 73/504.14

FOREIGN PATENT DOCUMENTS 942973   2/1997  Japan .
9127148  5/1997  Japan .
1096631  4/1998  Japan .

Primary Examiner—Hezron Williams
Assistant Examiner—Helen C. Kwok
Attorney, Agent, or Firm—Sughrue, Mion, Zinn, Macpeak & Seas, PLLC

[57] ABSTRACT

A first floating body is supported by a silicon substrate so as to be movable in the x-direction and substantially unmovable in the y-direction. A second floating body is supported by the first floating body so as to be substantially unmovable in the x-direction and movable in the y-direction. A driving circuit and a pair of fixed electrodes having comb finger electrodes vibration-drive the first movable body in the x-direction. Fixed comb finger electrodes and a capacitance detection circuit detect a y-directional displacement of the second movable body and generate a displacement signal. A signal processing circuit converts the displacement signal into an angular rate signal.

17 Claims, 21 Drawing Sheets

Fig. 11
(a)
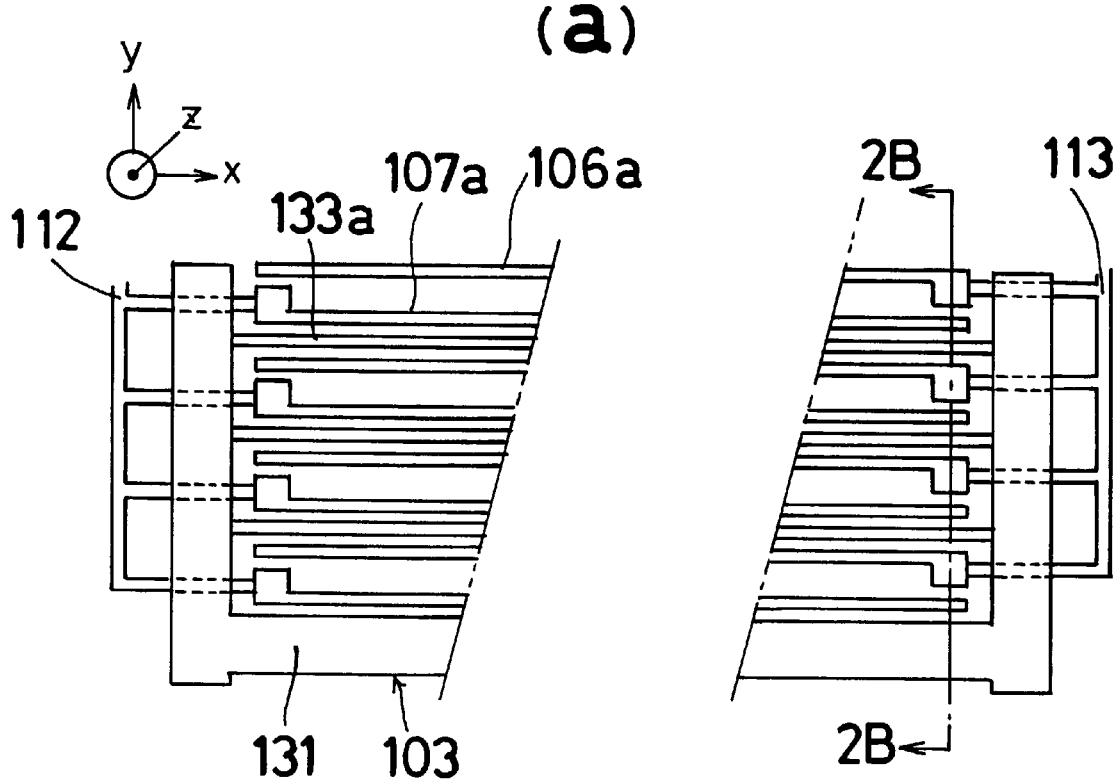
(b)
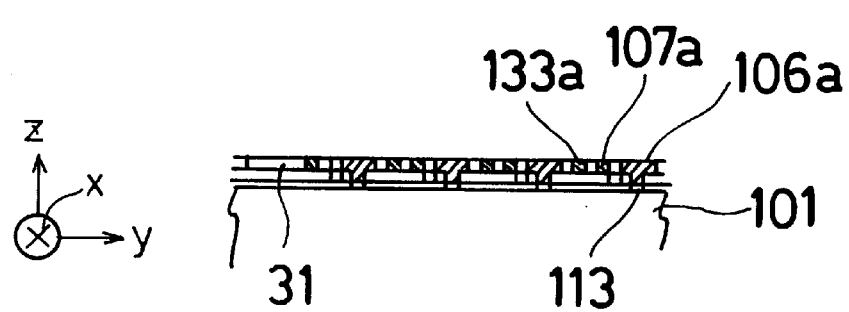

ENLARGED A PORTION

SECTIONAL VIEW OF B PORTION

ANGULAR RATE SENSOR

BACKGROUND OF THE INVENTION

1. Field of the Invention

The present invention relates to an angular rate sensor having a vibrator that is supported by a substrate in a floated manner. In particular, the invention relates to an angular rate sensor in which a floating semiconductor thin film that has been formed by a semiconductor micromachining technique is driven in the x-direction by electrically causing attraction for the thin film and its cancellation by using interdigitated comb electrodes, though the invention is not limited to such a case.

2. Description of the Related Art

In typical angular rate sensors of the above type, a floating thin film has one set of floating comb finger electrodes at each of its left-side and right-side positions (left-side floating comb finger electrodes and right-side floating comb finger electrodes). Two sets of fixed comb finger electrodes are also provided. That is, left-side fixed comb finger electrodes and right-side fixed comb finger electrodes each of which are interdigitated, in a parallel manner, with those of each corresponding set of floating comb electrodes so as not to contact the latter. The floating thin film is vibrated in the x-direction by applying voltages alternately between the left-side floating comb finger electrodes and the left-side fixed comb finger electrodes and between the right-side floating comb finger electrodes and the right-side fixed comb finger electrodes. When the floating thin film has an angular rate of rotation about the z-axis, it receives a Coriolis force and comes to vibrate also in the y-direction (elliptical vibration). Where the floating thin film is a conductor or is formed by joining electrodes and a detection electrode is provided on a substrate so as to be parallel with the xz-plane of the floating thin film, the capacitance between the detection electrode and the floating thin film oscillates so as to correspond to the y-component (angular rate component) of the elliptical vibration. The angular rate can be determined by measuring a variation (in amplitude) of the capacitance. Reference is made to Japanese Unexamined Patent Publication Nos. Hei. 9-127148 and Hei. 9-42973 and Japanese Patent Application Nos. Hei. 8-249822 and Hei. 9-121989.

Conventionally, in the above type of angular rate sensor using a semiconductor thin film as a floating body (floating thin film), interdigitated comb finger electrodes or parallel plate electrodes are used for driving the floating body electrostatically in the x-direction that is parallel with a substrate or for detecting a displacement through capacitance. Those electrodes use a surface (xz-plane) formed by etching the semiconductor thin film.

From the principle of angular rate detection, the floating body needs to be movable in both x and y-directions. Therefore, conventionally, the floating body is made movable in both x and y-directions and supported by the substrate. The driving in the x-direction of the floating body is performed by parallel plate electrodes (floating comb finger electrodes and fixed comb finger electrodes) extending in the x-direction, and the parallel plate electrodes tend to exert attractive force in the y-direction on the floating body. One floating comb finger electrode extending in the x-direction is interposed, via gaps, between two fixed comb finger electrodes extending in the x-direction. If the one floating comb finger electrode is correctly located at the center of the gap between the two fixed comb finger electrodes, the two fixed comb finger electrodes exert electrostatic attractive forces, respectively, in the y-direction having the same absolute value and opposite directions to the one floating comb finger electrode and hence the fixed comb finger electrodes do not apply any driving force to the floating comb finger electrodes. However, if the one floating comb finger electrode is deviated even slightly toward one of the two fixed comb finger electrodes from the center of the gap between the two fixed comb finger electrodes, the fixed comb finger electrodes apply driving force in the y-direction to the floating comb finger electrodes even if the floating body does not have an angular rate about the z-axis and the floating body is thereby moved in the y-direction.

Having the same period as a displacement that occurs when the floating body has an angular rate, this movement may cause an offset that results in an event that a detection signal of the same kind as would be obtained when an angular rate exists is generated when there exists no angular rate. This movement may also cause an offset variation due to a temperature variation (i.e., a temperature drift) and hence tends to lower the accuracy of angular rate detection.

Further, since the floating body needs to be movable in both x and y-directions, the spring constant in the z-direction of a structure for supporting the floating body with respect to the substrate tends to be small. If the spring constant is small, the relative position in the z-direction of the floating comb finger electrodes with respect to the fixed comb finger electrodes is deviated by a displacement in the z-direction of the floating body due to acceleration in the z-direction and the capacitance between those electrodes is thereby varied. A variation in the capacitance acts as a disturbance for the detection of an angular rate about the z-axis. Therefore, it is preferable to prevent a displacement of the floating body in the z-direction that is caused by acceleration in the z-direction.

FIG. 22 shows an example of a conventional angular rate sensor. Floating body anchors 305, electrode pads for fixed electrodes, and an electrode pad 315 for vibration detection electrodes, all of which are made of polysilicon containing an impurity for imparting conductivity (hereinafter referred to as conductive polysilicon), are joined to a silicon substrate 301 that is formed with an insulating layer. A floating body 302 and fixed electrodes 308, which are semiconductor thin films made of conductive polysilicon, are connected to connection electrodes via wiring lines 312 that are formed on the insulating layer on the silicon substrate 301. Each floating body anchor 305 is continuous with floating support beams 318 extending in the x-direction, which are continuous with respective floating support beams 304 extending in the y-direction. The floating support beams 304 are continuous with the rectangular-ring-like floating body 302 that is substantially parallel with the surface of the substrate 301.

A plurality of moving-side comb finger electrodes 306 for x-driving, which are arranged in the y-direction at a constant pitch, project from the floating body 302 leftward and rightward in the x-direction. Each fixed electrode 308 has fixed comb finger electrodes 307 for x-driving that are inserted in interfinger slots of the moving-side comb finger electrodes 306. Very small gaps exist between the moving-side comb finger electrodes 306 for x-driving and the fixed comb finger electrodes 307 for x-driving.

A number of electrodes 309 for y-displacement detection that extend in the x-direction are arranged in the y-direction on the floating body 302. One of many fixed electrodes 310 of a first set for y-displacement detection and one of many fixed electrodes 311 of a second set for y-displacement detection are located in each one-pitch gap of the electrodes 309. The fixed electrodes 310 of the first set are connected to a wiring line 314 that is formed on the insulating layer on the silicon substrate 301, and the fixed electrodes 311 of the second set are connected to the other wiring line that is similar to the wiring line 314 and is formed on the insulating layer on the silicon substrate 301.

The floating support beams 304 and 318, the floating body 302, and the comb fingers 307 of the fixed electrodes 308 are separated from the surface of the substrate 301 in the z-direction. That is, the former are opposed to the surface of the substrate 301 with a gap in between. The floating support beams 304 and 318, the floating body 302, and the comb fingers 307 of the fixed electrodes 308 are formed so as to be continuous with and integral with the floating body anchors 305 and the electrode pads for the fixed electrodes 308 after the floating body anchors 305 and the electrode pads for the fixed electrodes 308 have been formed on the surface of the silicon substrate 301 by a micromachining technique. In this specification, a supporting mode in which, as described above, a body is separated from the surface of the substrate 301 in the z-direction and can be displaced or bent in the x and/or y-direction with respect to the substrate 301 is called "floating" or "movable."

Since the floating support beams 304 for supporting the floating body 302 are floated above the substrate 301 and extend in the y-direction, they are not bent in the y-direction but are prone to be bent in the x-direction. Therefore, the floating body 302 is prone to vibrate in the x-direction. Further, since the floating support beams 318 that are continuous with the floating support beams 304 are floated above the substrate 301 and extend in the x-direction, they are not bent in the x-direction but are prone to be bent in the y-direction. Therefore, the floating body is prone to vibrate in the y-direction, too.

The floating body 302 is connected to an x-driving circuit (not shown) via the floating support beams 304 and 318 and a wiring line 313 and is connected to the apparatus ground (GND) there. The two fixed electrodes 308 are connected to the x-driving circuit via the respective wiring lines 312 and electrode pads. The x-driving circuit applies high voltages alternately to the two fixed electrodes 308 and repeats this operation. The floating body 302 is attracted rightward (as viewed in FIG. 22) when a high voltage is applied to the right-side fixed electrode 308 and is attracted leftward when a high voltage is applied to the left-side fixed electrode 308, whereby the floating body 302 is vibrated in the x-direction.

When the floating body 302 has an angular rate of rotation about the z-axis, a Coriolis force is exerted on the floating body 302 and is thereby vibrated also in the y-direction (elliptical vibration). When the floating body 302 is moved in the +y direction, the distance (or the capacitance) between the movable electrodes 309 of the floating body 302 and the fixed electrodes 311 decreases (or increases) and the distance (or the capacitance) between the movable electrodes 309 of the floating body 302 and the fixed electrodes 310 increases (or decreases). When the floating body 302 is moved in the −y direction, the distance varies in the opposite manner. While the movable electrodes 309 are kept at the apparatus ground (GND) potential, the fixed electrodes 310 and 311 are connected to a capacitance detection circuit (not shown). The capacitance detection circuit generates an electrical signal that represents a difference between the capacitances between the movable electrodes 309 and the fixed electrodes 310 and 311. The level of the electrical signal corresponds to the amplitude of vibration of the floating body 302 in the y-direction. A signal processing circuit (not shown) converts the electrical signal into a signal representing an angular rate (i.e., an angular rate signal).

From the principle of angular rate detection, the floating body needs to be movable in both x and y-directions. Therefore, conventionally, the floating body is made movable in both x and y-directions and supported by the substrate. Incidentally, the driving in the x-direction of the floating body is performed by the parallel plate electrodes (floating comb finger electrodes and fixed comb finger electrodes) extending in the x-direction, and the parallel plate electrodes tend to exert attractive force in the y-direction on the floating body. One floating comb finger electrode extending in the x-direction is interposed, via gaps, between two fixed comb finger electrodes extending in the x-direction. If the one floating comb finger electrode is correctly located at the center of the gap between the two fixed comb finger electrodes, the two fixed comb finger electrodes exert electrostatic attractive forces, respectively, in the y-direction having the same absolute value and opposite directions to the one floating comb finger electrode and hence the fixed comb finger electrodes do not apply any driving force to the floating comb finger electrodes. However, if the one of the floating comb finger electrodes is deviated even slightly toward one of the two fixed comb finger electrodes from the center of the gap between the two fixed comb finger electrodes, the fixed comb finger electrodes apply driving force in the y-direction to the floating comb finger electrodes even if the floating body does not have an angular rate about the z-axis and the floating body is thereby moved in the y-direction.

Having the same period as a displacement that occurs when the floating body has an angular rate, this movement may cause an offset that results in an event that a detection signal of the same kind as would be obtained when an angular rate exists is generated when there exists no angular rate. This movement may also cause an offset variation due to a temperature variation (i.e., a temperature drift) and hence tends to lower the accuracy of angular rate detection.

Further, since the floating body needs to be movable in both x and y-directions, the spring constant in the z-direction of a structure for supporting the floating body with respect to the substrate tends to be small. If the spring constant is small, the relative position in the z-direction of the floating electrodes with respect to the fixed electrodes is deviated by a displacement in the z-direction of the floating body due to acceleration in the z-direction and the capacitance between those electrodes is thereby varied. A variation in the capacitance acts as a disturbance for the detection of an angular rate about the z-axis. Therefore, it is preferable to prevent a displacement of the floating body in the z-direction that is caused by acceleration in the z-direction.

Further, since a displacement of the movable portion due to a Coriolis force is small, a detection signal is small, as a result of which high-precision detection circuits (i.e., the above-mentioned capacitance detection circuit and signal processing circuit) are required. On the other hand, if it is intended to increase a detection signal, the sensor becomes larger and the material costs increase.

SUMMARY OF THE INVENTION

An object of the present invention is to increase the accuracy of angular rate detection and, more specifically, to prevent a detection of an angular rate signal that is generated when no angular rate exists.

Another object of the invention is to prevent both of a detection of an angular rate signal that is generated when no angular rate exists and a level variation of an angular rate signal due to acceleration in the z-direction.

According to a first aspect of the invention, there is provided an angular rate sensor comprising a substrate (1); a first movable body (2) that is supported by the substrate (1) so as to be movable in the x-direction and substantially unmovable in the y-direction; a second movable body (3) that is supported by the first movable body (2) so as to be substantially unmovable in the x-direction and movable in the y-direction; driving means (4, 5, 15) for vibration-driving the first movable body (2) in the x-direction; displacement detecting means (6a, 6b, 7a, 7b, 12, 13, 17) for detecting a y-directional displacement of the second movable body (3), and generating a displacement signal; and converting means (18) for converting the displacement signal into an angular rate signal.

When the driving means (4, 5, 15) vibration-drives the first movable body (2) in the x-direction, the second movable body (3) is vibrated in the x-direction together with the first movable body (2). When an angular rate about the z-direction occurs, substantially no y-directional vibration is caused in the first movable body (2) but the second movable body (3) moves also in the y-direction. As a result, the displacement detecting means (6a, 6b, 7a, 7b, 12, 13, 17) generates a displacement signal representing the y-directional displacement of the second movable body (3), which is converted into an angular rate signal by the converting means (18).

Since the first movable body (2) is substantially unmovable in the y-direction, substantially no y-directional displacement is caused in the first movable body (2) even if it receives y-directional driving force due to x-directional vibration driving. Therefore, the second movable body (3) that is supported by the first movable body (2) is not moved in the y-direction by the x-directional vibration driving. The displacement signal is not detected when no angular rate exists. This increases the accuracy of the angular rate detection.

The first movable body (2) has a rectangular ring shape (21) when projected onto the xy-plane, and the centers of gravity of the first movable body (2) and the second movable body (3) are located substantially at the same position. Since the first movable body (2) has a rectangular ring shape, its center of gravity is located at the center of the rectangular ring (21). When driven in the x-direction, the first movable body (2) is translated in the x-direction; the x-directional vibration of the first movable body is well balanced. Since the center of gravity of the second movable body (3) is located at the same position as that of the first movable body (2), the second movable body (3) does not destroy the balance of the x-directional vibration of the first movable body (2). Conversely, the first movable body (2) does not destroy the balance of the y-directional vibration of the second movable body (3).

The first movable body (2) is supported so as to be floated with respect to the substrate (1) by beams (22a–22d) that extend in the y-direction and have one end fixed to the substrate (1). Since the beams (22a–22d) extend in the y-direction, they are not bent in the y-direction but are bent in the x-direction. Therefore, the first movable body (2) is floated so as to be unmovable in the y-direction and movable in the x-direction with respect to the substrate (1). The first movable body (2) is supported in a floated manner and moved only in the x-direction in a reliable manner.

The second movable body (3) is supported so as to be floated with respect to the substrate (1) by beams (32a–32d) that extend in the x-direction and have one end fixed to the first movable body (2). Since the beams (32a–32d) extend in the x-direction, they are not bent in the x-direction but are bent in the y-direction. Therefore, the second movable body (3) are floated so as to be unmovable in the x-direction and movable in the y-direction with respect to the first movable body (2). The second movable body (3) is supported so as to be floated with respect to the first movable body (2) and moved only in the y-direction in a reliable manner.

According to a second aspect of the invention, an angular rate sensor comprising a substrate (101) is provided; a first movable body (102) that is supported by the substrate (101) so as to be movable in the x-direction and substantially unmovable in the y-direction; a second movable body (103) that is supported by the substrate (101) so as to be movable in the y-direction and substantially unmovable in the x-direction; a third movable body (I) that is movable both in the x and y-directions, connected to the first movable body (102) so as to be movable in the y-direction and substantially unmovable in the x-direction with respect to the first movable body (102), and connected to the second movable body (103) so as to be movable in the x-direction and substantially unmovable in the y-direction with respect to the second movable body (103); driving means (104, 105, 115) for vibration-driving the first movable body in the x-direction; displacement detecting means (106a, 106b, 107a, 107b, 112, 113, 117) for detecting a y-directional displacement of the second movable body (103), and generating a displacement signal; and converting means (118) for converting the displacement signal into an angular rate signal.

When the driving means (104, 105, 115) vibration-drives the first movable body (102) in the x-direction, the third movable body (I) is vibrated in the x-direction together with the first movable body (102). When an angular rate about the z-direction occurs, substantially no y-directional vibration is caused in the first movable body (102) but the third movable body (I) moves also in the y-direction. As a result, the second movable body (103) is vibrated in the y-direction and the displacement detecting means (106a, 106b, 107a, 107b, 112, 113, 117) generates a displacement signal representing the y-directional displacement of the second movable body (103), which is converted into an angular rate signal by the converting means (118).

To cause the movable bodies to react to an angular rate about the z-direction, the first movable body (102) is driven only in the x-direction. The second movable body (103) for obtaining a signal corresponding to an angular rate is rendered movable only in the y-direction, and the first movable body (102) and the second movable body (103) are connected to each other via the third movable body (I). The third movable body (I) is rendered movable in both the x and y-directions with respect to the substrate (101), only in the y-direction with respect to the first movable body (102), and only in the x-direction with respect to the second movable body (103). Since the first movable body (102) is substantially unmovable in the y-direction, substantially no y-directional displacement is caused in the first movable body (102) even if it receives y-directional driving force due to x-directional vibration driving. Therefore, the third movable body (I) and the second movable body (103) are not moved in the y-direction by the x-directional vibration driving. The displacement signal is not detected when no angular rate exists. This increases the accuracy of the angular rate detection.

The third movable body (I) vibrates in the x-direction while reliably transmitting x-directional driving force that is applied to the first movable body (102). When an angular rate about the z-direction occurs, the third movable body vibrates also in the y-direction, and this y-directional vibration is reliably transmitted to the second movable body (103). The second movable body (103) is supported by the substrate (101) so as to be movable in the y-direction but substantially unmovable in the x-direction. By virtue of this supporting structure, the spring constant of the second movable body (103) is made large and the z-directional displacement of the second movable body (103) due to z-directional acceleration is made small. Therefore, the S/N ratio can be increased.

The first movable body (102) and the third movable body (I) have a rectangular ring shape when projected onto the xy-plane, the third movable body (I) is located in the internal space of the first movable body (102) and the second movable body (103) is located in the internal space of the third movable body (I), and the centers of gravity of the first, second, and third movable bodies are located substantially at the same position (see FIG. 10). Since the third movable body (I) is located in the internal space of the first movable body (102) and their centers of gravity are located at the same position, the third movable body (I) does not destroy the balance of x-directional vibration of the first movable body (102). Similarly, since the second movable body (103) is located in the internal space of the third movable body (I) and their centers of gravity are located at the same position, the third movable body (I) does not destroy the balance of y-directional vibration of the second movable body (103). Therefore, the motion of each movable body is well balanced and hence an angular rate can be converted into y-directional vibration with high efficiency.

In the embodiment of FIG. 13, the second movable body (103) and the third movable body (I) have a rectangular ring shape when projected onto the xy-plane, the third movable body (I) is located in the internal space of the second movable body (103) and the first movable body (102) is located in the internal space of the third movable body (I), and the centers of gravity of the first, second, and third movable bodies are located substantially at the same position. In contrast to the above embodiment (FIG. 10) in which the second movable body (103), the third movable body (I), and the first movable body (102) are arranged in this order from the position of the centers of gravity, in the embodiment of FIG. 13, the first movable body (102), the third movable body (I), and the second movable body (103) are arranged in this order from the position of the centers of gravity; that is, the positions of the first movable body (102) and the second movable body (103) are interchanged. However, in this embodiment, as in the case of the above embodiment, the motion of each movable body is well balanced and hence an angular rate can be converted into y-directional vibration with high efficiency.

The first movable body (102) is supported so as to be floated with respect to the substrate (101) by beams (122a–122d) that extend in the y-direction and have one ends fixed to the substrate (101). Since the beams (122a–122d) extending in the y-direction are not bent in the y-direction but are bent in the x-direction, the first movable body (102) is supported in a floated manner so as to be unmovable in the y-direction and movable in the x-direct ion with respect to the substrate (101). The first movable body (102) is supported in a floated manner and moved only in the x-direction in a reliable manner.

The second movable body (103) is supported so as to be floated with respect to the substrate (101) by beams (132a–132d) that extend in the x-direction and have one ends fixed to the substrate (101). Since the beams (132a–132d) extending in the x-direction are not bent in the x-direction but are bent in the y-direction, the second movable body (103) is supported in a floated manner so as to be unmovable in the x-direction and movable in the y-direction with respect to the substrate (101). The second movable body (103) is supported in a floated manner and moved only in the y-direction in a reliable manner.

The third movable body (I) is connected to the first movable body (102) via beams (Ix1–Ix4) extending in the x-direction, and to the second movable body (103) via beams (Iy1–Iy4) extending in the y-direction. Connected to the first movable body (102) via the beams (Ix1–Ix4) extending in the x-direction, the third movable body (I) moves in the x-direction together with the first movable body (102). Further, being capable of vibrating in the y-direction in which the first movable body (102) cannot vibrate, the third movable body (I) vibrates also in the y-direction when an angular rate about the z-axis occurs. While this y-directional vibration is transmitted to the second movable body (103) via the beams (Iy1–Iy4) extending in the y-direction, x-directional vibration is prevented by the beams (Iy1–Iy4) from being transmitted from the third movable body (I) to the second movable body (103). Only the y-directional vibration of the third movable body (I) is transmitted to the second movable body (103) in a reliable manner.

The centers of gravity of the first movable body (102), the second movable body (103), and the third movable body (I) are located substantially at the same position, and the first, second, and third movable bodies are shaped so as to be substantially symmetrical with respect to an xz-plane and a yz-plane passing through the centers of gravity. In this case, driving force and a Coriolis force are applied to the floating bodies (102, 103, I) substantially along the lines passing through the centers of gravity, and substantially no rotation moment occurs due to a difference between the positions of the centers of gravity of the respective floating bodies (102, 103, I). Therefore, substantially no unnecessary vibration and deviations of the vibration directions occur, whereby the S/N ratio of the angular rate detection is increased.

According to a third aspect of the invention (FIG. 14), there is provided an angular rate sensor comprising a substrate (201); a first movable body (202) that is supported by the substrate (201) via first beams (217) that are movable only in the x-direction so as to be movable in the x-direction and substantially unmovable in the y-direction; a second movable body (203) that is supported by the substrate (201) via second beams (219) that are movable only in the y-direction so as to be movable in the y-direction and substantially unmovable in the x-direction;

A third movable body (204) that is movable in both the x and y-directions, connected to the first movable body (202) via third beams (216) that are movable only in the y-direction, and connected to fourth beams (218) that branch off from the respective second beams (219) and are movable only in the x-direction with respect to respective branching points; driving means (206, 207, 231) for vibration-driving the first movable body (202) in the x-direction; displacement detecting means (209–211, 232) for detecting a y-directional displacement of the second movable body (203), and generating a displacement signal; and converting means (233) for converting the displacement signal into an angular rate signal.

When the driving means (206, 207, 231) vibration-drives the first movable body (202) in the x-direction, the third movable body (204) is vibrated in the x-direction together with the first movable body (202). Supported by the substrate (201) via the second beams (219) that are movable only in the y-direction, the second movable body (203) does not vibrate in the x-direction. When an angular rate occurs about the z-direction, Coriolis force $$F = 2mv\Omega$$

where

F: Coriolis force;

m: mass;

v: speed of the mass; and

Ω: angular rate is exerted on the first, second, and third movable bodies (202, 203, 204). Since the first movable body (202) is movable only in the x-direction, it has no displacement due to the Coriolis force (i.e., vibration in the y-direction). On the other hand, the third movable body (204) is vibrated also in the y-direction by the Coriolis force. The third movable body (204) are connected to the second movable body (203) via the fourth beams (218) that branch off from the respective second beams (219) and are movable only in the x-direction with respect to the respective branching points, and both of the second movable body (203) and the third movable body (204) vibrate in the y-direction. The displacement detecting means (209–211, 232) generates a displacement signal representing the y-directional displacement of the second movable body (103), which is converted into an angular rate signal by the converting means (233).

Since the y-directional displacement of the second movable body (203) is larger than that of the third movable body (204) according to the principle of leverage, a relatively high-level displacement signal corresponding to the angular rate can be obtained and hence the accuracy of the angular rate detection can be increased.

Since the first movable body (202) is movable only in the x-direction with respect to the substrate (201), even if y-directional driving force is exerted on the first movable body (202) due to, for instance, an unbalanced arrangement of the driving means (driving electrodes 206 and 207), the first movable body (202) vibrate only in the x-direction and the vibration of the third movable body (204) is limited to the x-direction. As a result, the vibration of the second movable body (203) in the y-direct ion due to the driving force for the x-driving is reduced in amplitude, and hence the S/N ratio of a displacement signal generated by the displacement detecting means (209–211, 232) can be increased.

In the following embodiments, as in the conventional case, the driving means (206, 207, 231) includes driving comb finger electrodes (206, 207) and the displacement detecting means (209–211, 232) includes movable electrodes (209) and fixed electrodes (210, 211). However, since the second movable body (203) is movable only in the y-direction, the relative positional relationship in the x-direction between the movable electrodes (209) and the fixed electrodes (210, 211) is kept constant. Therefore, even if the x-driving direction or the relative positional relationship in the x-direction between the movable electrodes (209) and the fixed electrodes (210, 211) deviates from the parallel one due to, for instance, a working error in a sensor element forming process, resulting noise can be made small.

The centers of gravity of movable portions of the first, second, and third movable bodies (202–204) are located substantially at the same position in the xy-plane in a stationary state. In this case, there does not occur an event that vibration of one of the first, second, and third movable bodies (202–204) affects vibration of another to destroy its balance. Since the motion of each movable body is well balanced, the efficiency of converting an angular rate into y-directional vibration is high and the S/N ratio is increased.

At least one of the first, second, and third movable bodies (202–204) is symmetrical with respect to an x-axis and a y-axis passing through the centers of gravity in a stationary state, or at least one set of beams of the first, second, third, and fourth beams (217, 219, 216, 218) are symmetrical with respect to an x-axis or a y-axis passing through the center of gravity of the movable body to which the one set of beams are connected.

In this case, rotation moment caused by asymmetry of the movable bodies is not exerted on x-directional vibration caused by the x-directional driving or y-directional vibration generated when an angular rate about the z-axis occurs. Further, no rotation moment is exerted on the movable bodies due to asymmetry of the beams. Therefore, vibration of each movable body is kept stable, the efficiency of converting an angular rate into y-directional vibration is high, and the S/N ratio is increased.

The first movable body (202) and the first beams (217) are made of a semiconductor thin film and the first beams (217) extend in the y-direction, or the second movable body (203) and the second beams (219) are made of a semiconductor thin film and the second beams (219) extend in the x-direction.

In this case, since the first beams (217) extend in the y-direction, they are prone to be bent in the x-direction but are not bent in the y-direction, to thereby restrict the vibration direction of the first movable body (202) to the x-direction. Therefore, the second and third movable bodies (203, 204) are not driven in the y-direction (i.e., the angular rate detecting direction) by the first movable body (202). That is, when the first movable body (202) is driven, the y-directional vibration of the second movable body (203) is reduced and the second movable body (203) is moved in the y-direction only by a Coriolis force. This increases the S/N ratio. Since the second movable body (203) is movable only in the y-direction and the second beams (219) are directly connected to the substrate (201), the second movable body is resistant to acceleration in the z-direction. The sensor is highly adaptable to a use environment.

In the above embodiment in which the driving means (206, 207, 231) includes driving comb finger electrodes (206, 207) and the displacement detecting means (209–211, 232) includes movable electrodes (209) and fixed electrodes (210, 211), the relative positional relationship in the x-direction between the movable electrodes (209) and the fixed electrodes (210, 211) is kept constant, as described above. Therefore, even if the x-driving direction or the relative positional relationship in the x-direction between the movable electrodes (209) and the fixed electrodes (210, 211) deviates from a parallel relationship due to, for instance, a working error in a sensor element forming process, the resulting noise can be made small.

The third movable body (204) and the third and fourth beams (216, 218) are made of a semiconductor thin film, and the third beams and fourth beams (216, 218) extend in the x-direction and y-direction, respectively. In this case, the third beams and fourth beams (216, 218) are moveable in the y-direction and the x-direction, respectively. Since the third movable body (204) is firmly connected to the first movable body (202) via the third beams extending in the x-direction, these movable bodies vibrate in the x-direction substantially as one body. The fourth beams (218) branch off so as to extend in the y-direction from the second beams (218) extending in the x-direction. Therefore, when the third movable body (204) vibrates in the y-direction when an angular rate occurs, the fourth beams (218) vibration-drives the branching points in the y-direction. As a result, according to the principle of leverage, the third beams (216) are vibrated widely in the y-direction, to cause the second movable body (203) to vibrate in the y-directional at a large amplitude that corresponds to the angular rate. Therefore, the displacement signal has a high level and the S/N ratio of the angular rate signal is increased.

Other objects and features of the invention will become more apparent from the following description taken in connection with the accompanying drawings.

BRIEF DESCRIPTION OF THE DRAWINGS

FIG. 11A is an enlarged plan view of a portion 102A of a second floating body 103 shown in FIG. 10;

FIG. 11B is a sectional view taken along line 2B—2B in FIG. 11A;

DETAILED DESCRIPTION OF THE PREFERRED EMBODIMENTS

Embodiment 1

Figure 1:
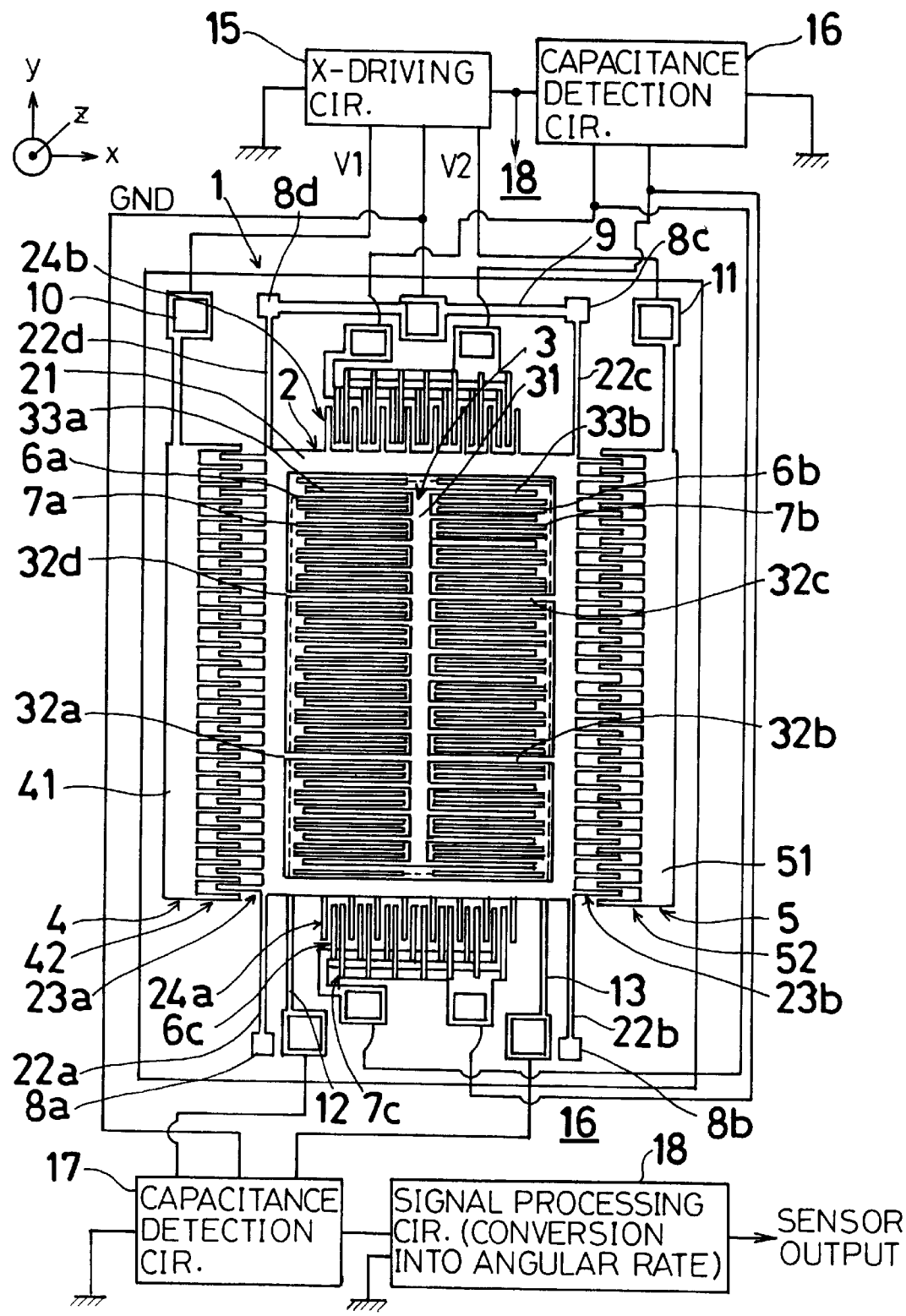
FIG. 1 is a plan view of a first embodiment of the present invention.
Figure 2:
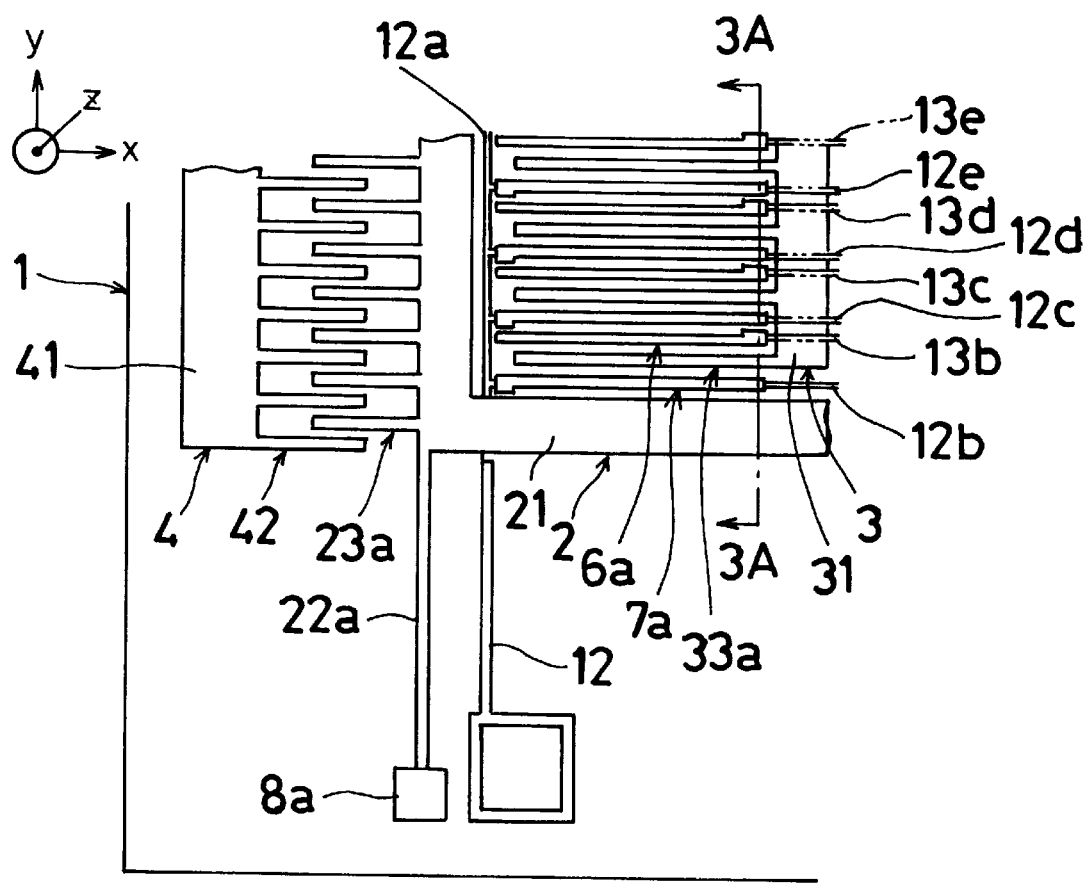
FIG. 2 is an enlarged plan view of a bottom-left corner portion of a first floating body 2 shown in FIG. 1.
Figure 3:
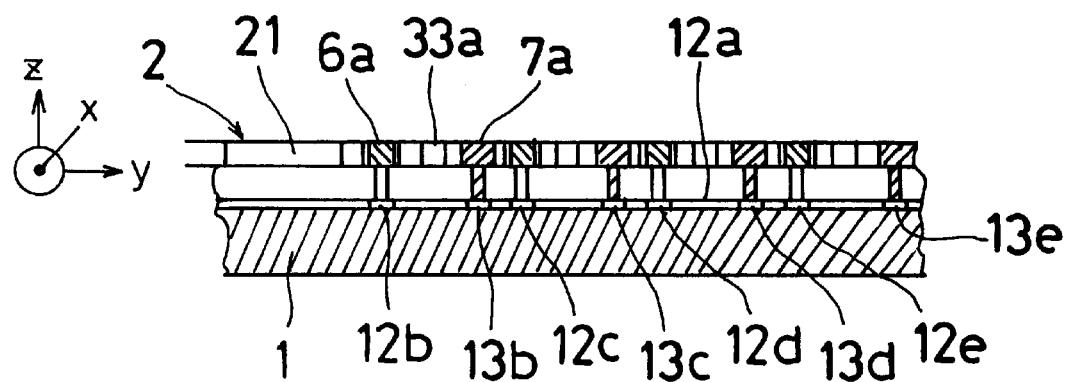
FIG. 3 is an enlarged sectional view taken along line 3A—3A in FIG. 2.

FIG. 1 shows a first embodiment according to the present invention, that is, an angular rate sensor for detecting an angular rate about the z-axis of a second floating body (3). FIG. 2 is an enlarged view of a bottom-left corner portion of a substrate (1) shown in FIG. 1. FIG. 3 is an enlarged sectional view taken along line 3A—3A in FIG. 2.

Referring to FIGS. 1–3, floating body anchors (8a–8d) and fixed electrode anchors (10) and (11), which are made of polysilicon containing an impurity for imparting conductivity (hereinafter referred to as conductive polysilicon), are joined to a silicon substrate (1) that is formed with an insulating layer. A first floating body (2), a second floating body (3), and fixed electrodes (4), (5), (6a–6c), and (7a–7c), all of which are semiconductor thin films made of conductive polysilicon, are connected to connection electrodes (solid squares) via wiring lines (9, 12, 13), etc. that are formed on the insulating layer on the silicon substrate (1). Another configuration is possible in which a substrate having an opposite conductivity type (n-type) to the conductivity type (p-type) of the above-mentioned polysilicon is used as the silicon substrate (1), wiring lines are formed on the silicon substrate (1) by forming pn junctions, and those wiring lines are joined to the floating body anchors (8a–8d), the fixed electrode anchors (10) and (11), and the anchor portions of the connection electrodes (solid squares).

The floating body anchors (8a–8d) are continuous with respective floating support beams (22a–22d) of a first set extending in the y-direction, which are continuous with the rectangular-ring-like first floating body (2) that is substantially parallel with the surface of the substrate (1).

A plurality of moving-side comb finger electrodes (23a) and (23b) for x-driving, which are arranged in the y-direction at a constant pitch, project from the first floating body (2) leftward and rightward (in the x-direction). One fixed electrode anchor is continuous with the trunk (41) of the fixed electrode (4), which has fixed comb finger electrodes (42) for x-driving that are inserted in interfinger slots of the moving-side comb finger electrodes (23a). The other fixed electrode anchor (11) is continuous with the trunk (51) of the fixed electrode (5), which has fixed comb finger electrodes (52) for x-driving that are inserted in interfinger slots of the moving-side comb finger electrodes (23b). Very small gaps exist between the moving-side comb finger electrodes (23a) and (23b) for x-driving and the fixed comb finger electrodes (42) and (52) for x-driving.

One ends of floating support beams (32a–32d) of a second set extending in the x-direction are continuous with and integral with a rectangular-ring-like trunk (21) of the first floating body (2), and the other ends of those floating support beams are continuous with and integral with a trunk (31) of the second floating body (3) that is located at the center of the inner space of the rectangular-ring-like trunk (21). Comb finger electrodes (33a) and (33b) for y-displacement detection extend from the trunk (31) of the second floating body (3) in the x-direction so as to be parallel with the floating support beams (32a–32d) of the second set, and are arranged in the y-direction. The floating support beams (32a–32d) of the second set and the comb finger electrodes (33*a*) and (33*b*) are arranged in the y-direction at a predetermined pitch. One of the many fixed comb finger electrodes (6*a*) and (6*b*) of a first set for y-displacement detection and one of the many fixed comb finger electrodes (7*a*) and (7*b*) of a second set for y-displacement detection are located in each one-pitch gap of the above arrangement. The fixed comb finger electrodes (6*a*) and (6*b*) of the first set are provided on branches (12*b*, 12*c*, 12*d*, 12*e*), . . . of the wiring line (12) (see FIGS. 2 and 3) that are formed on the insulating film on the silicon substrate (1). The branches (12*b*, 12*c*, 12*d*, 12*e*), . . . branch off from a wiring line (12*a*) that is continuous with the wiring line (12). The fixed comb finger electrodes (7*a*) and (7*b*) of the second set are provided on branches (13*a*, 13*b*, 13*c*, 13*e*), . . . of the wiring line (13) (see FIGS. 2 and 3) that are formed on the insulating film on the silicon substrate (1). The branches (13*a*, 13*b*, 13*c*, 13*e*), branch off from a wiring line (13*a*) that is continuous with the wiring line (13).

Movable comb finger electrodes (24*a*) for x-movement detection project in the y-direction from one of the two x-axis-extending portions of the first floating body (2). Comb finger electrodes (6*c*) of a first set for x-movement detection and comb finger electrodes (7*c*) of a second set for x-movement detection, which are provided on different wiring lines, are inserted in the interelectrode gaps of the movable comb finger electrodes (24*a*). Comb finger electrodes similar to the movable comb finger electrodes (24*a*), the comb finger electrodes (6*c*) of the first set, and the comb finger electrodes (7*c*) of the second set are provided for the other x-axis-extending portion of the first floating body (2).

The floating support beams (22*a*–22*d*) of the first set, the first floating body (2), the floating support beams (32*a*–32*d*) of the second set, the second floating body (3), and the comb fingers (42) and (52) of the fixed electrodes (4) and (5) are separated from the surface of the substrate (1) in the z-direction; that is, they are opposed to the surface of the substrate (1) with gaps in between. They are formed so as to be continuous with and integral with the floating body anchors and the fixed electrode anchors after the floating body anchors and the fixed electrode anchors have been formed on the surface of the silicon substrate (1) by a micromachining technique. In this specification, a supporting mode in which, as described above, a body is separated from the surface of the substrate (1) in the z-direction and can be displaced or bent in the x and/or y-direction with respect to the substrate (1) is called "floating" or "movable."

The first floating body (2) is shaped like a rectangular ring and is symmetrical with respect to its horizontal and vertical center lines, and the center of gravity is located at the intersection of the two diagonals. The second floating body (3), which is continuous with and integral with the floating support beams (32*a*–32*d*) of the second set, are also symmetrical with respect to its horizontal and vertical center lines and the center of gravity is located at the intersection of the two diagonals of the first floating body (2).

Since the floating support beams (22*a*–22*d*) of the first set for supporting the first floating body (2) are floated above the substrate (1) and extend in the y-direction, they are not bent in the y-direction but are prone to be bent in the x-direction, and hence the first floating body (2) is not prone to vibrate in the y-direction but is prone to vibrate in the x-direction. Since the second floating body (3) is continuous with and integral with the first floating body (2) and is supported by the first floating body (2) via the floating support beams (32*a*–32*d*) of the second set that extend in the x-direction, the second floating body (3) is also vibrated in the x-direction when the first floating body (2) is vibrated in the x-direction. The floating support beams (32*a*–32*d*) of the second set are not bent in the x-direction but are prone to be bent in the y-direction, and hence the second floating body (3) is not prone to vibrate in the x-direction but prone to vibrate in the y-direction. Therefore, when the entire sensor (1-3) has an angular rate about the z-axis, substantially no vibration occurs in the first floating body in the y-direction though the second floating body (3) is vibrated in the y-direction.

The first floating body (2) (and the second floating body 3) is connected to an x-driving circuit 15 via the wiring lines 9 on the substrate (1) and is connected to the apparatus ground (GND) there. The fixed electrodes (4) and (5) are connected to the x-driving circuit (15) via electrode conductors on the anchors (10) and (11). The x-driving circuit (15) applies high voltages alternately to the fixed electrodes (4) and (5) and repeats this operation. The first floating body (2) (and the second floating body 3) is attracted rightward (as viewed in FIG. 1) when a high voltage is applied to the fixed electrode (4) (comb finger electrodes 42) and is attracted leftward when a high voltage is applied to the fixed electrode (5) (comb finger electrodes 52), whereby the first floating body (2) is vibrated in the right-left direction.

When the first floating body (2) is moved leftward, the capacitance between the movable comb finger electrodes (24*a*) for x-movement detection and the fixed comb finger electrodes (6*c*) of the first set for x-movement detection decreases, whereas the capacitance between the movable comb finger electrodes (24*a*) for x-movement detection and the fixed comb finger electrodes (7*c*) of the second set for x-movement detection increases. When the first floating body (2) is moved rightward, the capacitances vary in opposite ways. The movable comb finger electrodes (24*a*) are kept at the apparatus ground potential (GND) and the fixed comb finger electrodes (6*c*) and (7*c*) are connected to a capacitance detection circuit (16). The capacitance detection circuit (16) generates an electrical signal representing a difference between the capacitance between the electrodes (24*a*) (kept at the apparatus ground potential GNU) and the electrodes (6*c*) and the capacitance between the electrodes (24*a*) and the electrodes (7*c*) and supplies it to the x-driving circuit (15). This electrical signal is an AC signal (hereinafter referred to as an x-vibration-synchronized signal) having a level variation that is synchronized with x-vibration of the first floating body (2). The x-driving circuit (15) switches, between the electrodes (4) and (5), the electrode to which a high voltage is to be applied every time the absolute value of the level of the AC signal reaches a preset value. As a result, the first floating body (2) (and the second floating body 3) is vibrated in the x-direction at a predetermined amplitude.

Another driving method is possible in which driving is performed at a resonance frequency though a PLL (phase-locked loop) control using a signal that is obtained by the capacitance detection circuit (16), a drive amplitude is determined by using a signal that is obtained by the capacitance detection circuit (16), and control is made so as to keep the amplitude constant by increasing and decreasing the drive voltage. This enables low-voltage driving.

The movable comb finger electrodes (24*a*) and the fixed comb finger electrodes (6*c*) and (7*c*) may be given the same shape and arranged in the same direction as the driving comb finger electrodes (23), (42), and (52). This increases the drive amplitude.

When the second floating body (3) is vibrated in the y-direction, the capacitance between the comb finger electrodes (33*a*) of the second floating body (3) and the fixed comb finger electrodes (6a) and (6b) increases and decreases, that is, vibrates, and the capacitance between the comb finger electrodes (33a) and the fixed comb finger electrodes (7a) and (7b) increases and decreases, that is, vibrates, with a phase opposite to the phase of the former capacitance. A capacitance detection circuit (17) generates an electrical signal (y-vibration-synchronized signal) representing a difference between the capacitance between the comb finger electrodes (33a) and the fixed comb finger electrodes (6a) and (6b) and the capacitance between the comb finger electrodes (33a) and the fixed comb finger electrodes (7a) and (7b), and supplies it to a signal processing circuit (18). Where the x-vibration of the second floating body (3) is constant, there is a certain relationship between the angular rate and the amplitude of the y-vibration of the second floating body (3). Based on this relationship, the signal processing circuit (18) converts the y-vibration-synchronized signal into a signal representing the angular rate (angular rate signal).

Figure 4:
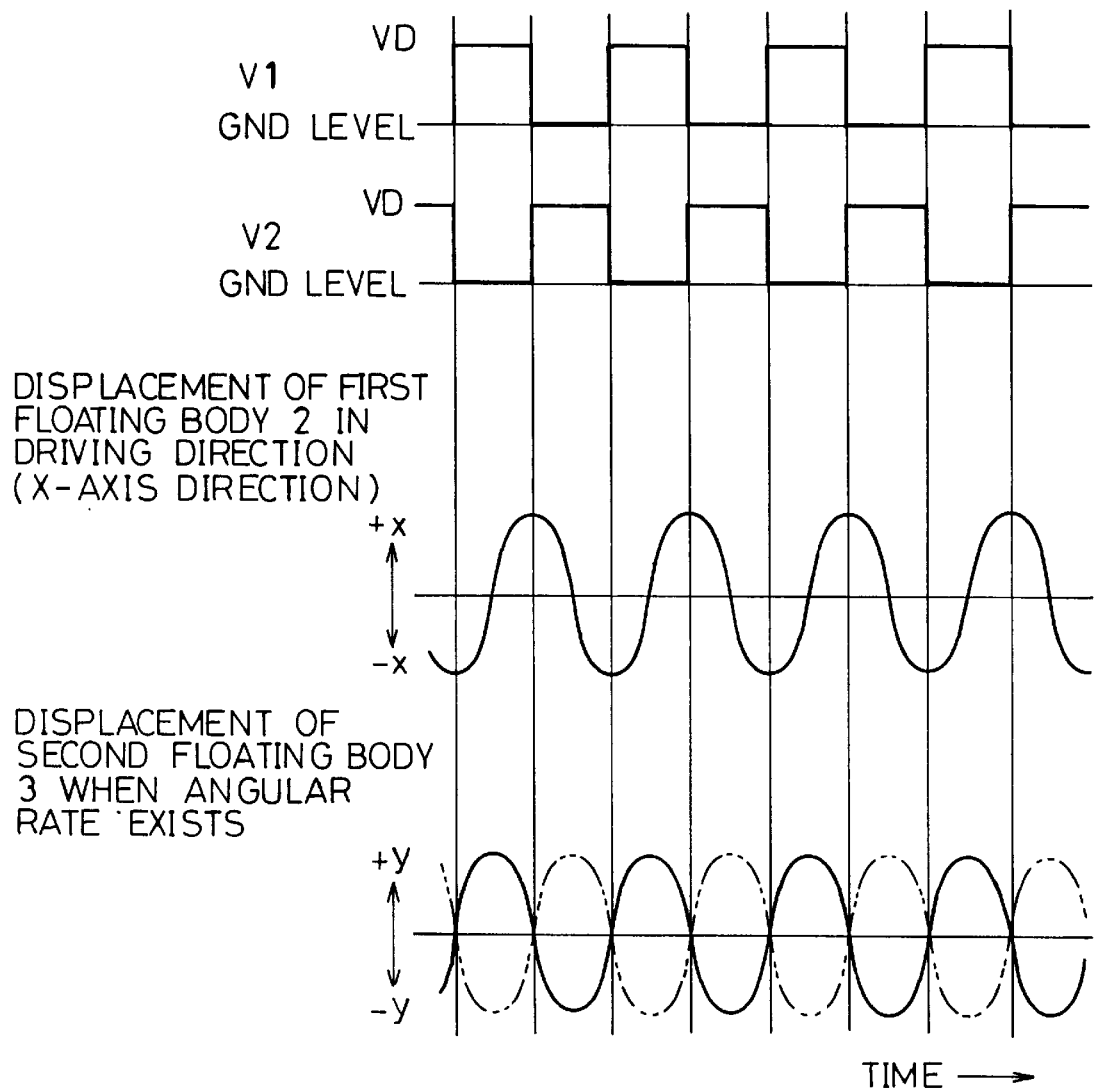
FIG. 4 is a time chart showing waveforms of output voltages of an x-driving circuit 15 shown in FIG. 1, an x-displacement of a first floating body 2, and a y-displacement of a second floating body 3.

FIG. 4 shows a relationship between voltages (V1) and (V2) that the x-driving circuit (15) applies to the respective fixed electrodes (4) and (5) and x-vibration (displacement in the x-direction) of the first floating body (2), and a relationship between the x-vibration of the first floating body (2) and y-vibration (displacement in the y-direction) of the second floating body (3). The y-vibration has one of two phases (corresponding to the respective y-displacement waveforms of a solid line and a two-dot chain line shown in FIG. 4) that are different from each other by 180°, depending on the direction of the angular rate (clockwise or counterclockwise). The signal processing circuit (18) judges the direction of the angular rate (clockwise or counterclockwise) based on a difference of the phase of the y-vibration-synchronized signal from that of the x-vibration-synchronized signal that is supplied from the capacitance detection circuit (16), and outputs a direction signal that represents the judged direction and an angular rate value signal that represents the absolute value of the angular rate corresponding to the amplitude of the y-vibration-synchronized signal.

In the above-described first embodiment, electrostatic attractive force in the +y or −y direction tends to be exerted on the movable comb finger electrodes (23a) and (23b) of the first floating body (2) from the fixed comb finger electrodes (42) and (52); that is y-driving force tends to act on the first floating body (2). However, since the first floating body (2) is supported by the floating support beams (22a–22d) of the first set extending in the y-direction, it is prevented from moving in the y-direction by the floating support beams (22a–22d) of the first set; the first floating body (2) is not moved in the y-direction by the x-driving voltages (V1) and (V2). In this manner, the efficiency of the x-vibration driving of the first floating body (2) (and the second floating body 3) is increased and the x-vibration is made stable.

On the other hand, since the second floating body 3 is supported by the first floating body (2) via the floating support beams (32a–32d) of the second set extending in the x-direction, it is prone to vibrate in the y-direction when an angular rate occurs. Since this y-vibration includes substantially no y-displacement due to the x-driving voltages (V1) and (V2) and the x-vibration is stable as described above, the y-vibration of the second floating body (3) corresponds to only the angular rate. Therefore, the angular rate signals (direction signal and angular rate value signal) that are output from the signal processing circuit (18) have large S/N ratios and the detection accuracy is highly stable.

Embodiment 2

Figure 5:
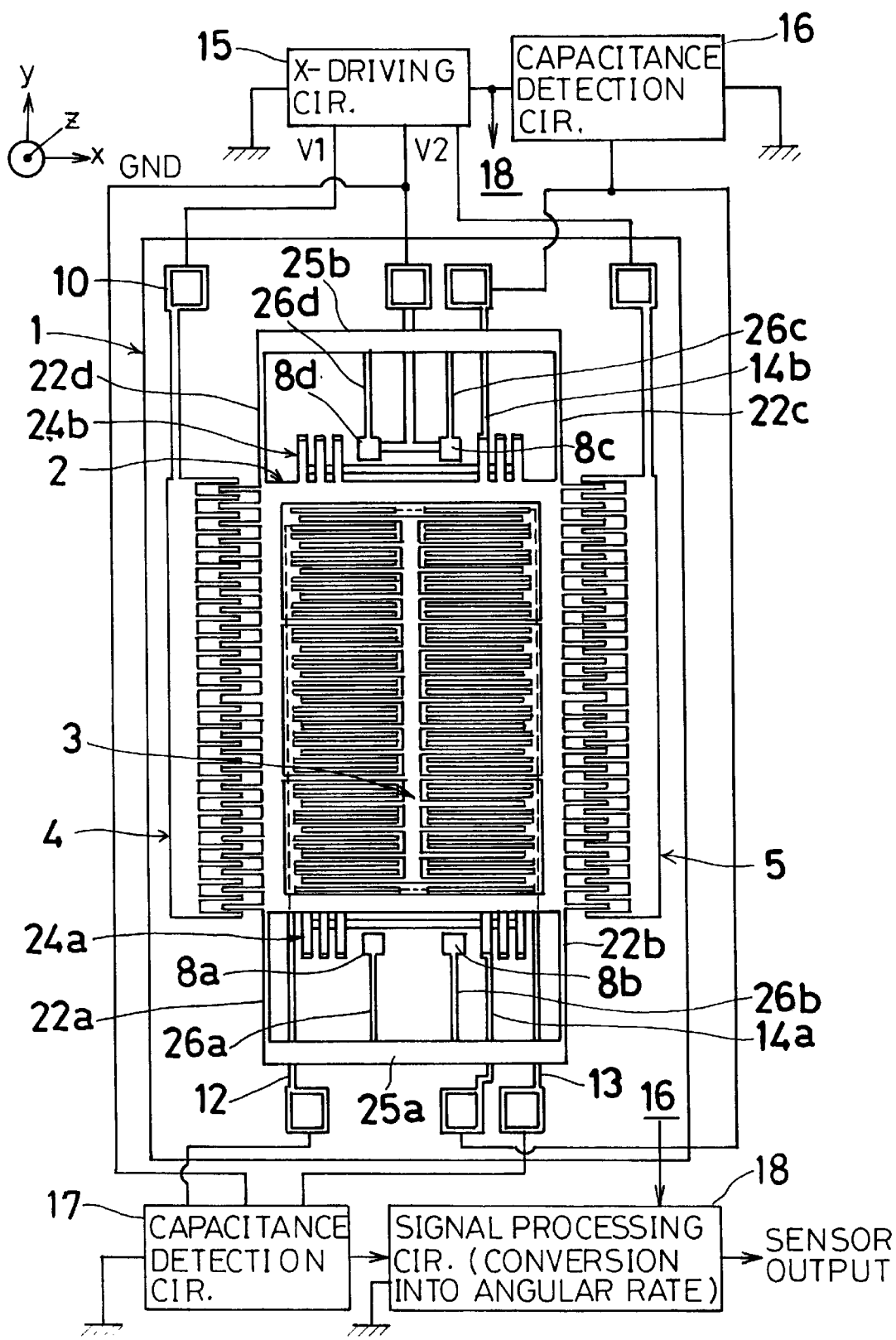
FIG. 5 is a plan view of a second embodiment of the invention.

FIG. 5 shows a second embodiment of the invention. In the second embodiment, floating support beams (26a–26d) of a third set extending in the y-direction are supported by fixed anchors (8a–8d). The floating support beams (26a–26d) are continuous with and integral with floating link beams (25a) and (25b) extending in the x-direction. The floating link beams (25a) and (25b) are continuous with and integral with the floating support beams (22a–22d) of the first set extending in the y-direction.

Since the floating support beams (26a–26d) of the third set extend in the y-direction, the floating link beams (25a) and (25b) are prone to move in the x-direction but are not in the y-direction. That is, in the second embodiment, the first floating body (2) is supported, in a floated manner, by the floating support beams (22a–22d) of the first set and the floating support beams (26a–26d) of the third set, both of which extend in the y-direction, and the floating link beams (25a) and (25b). The first floating body (2) is prevented from moving in the y-direction by the floating support beams (22a–22d) of the first set and the floating support beams (26a–26d) of the third set. However, since the floating support beams (22a–22d) and (26a–26d) of the two sets are prone to be bent in the x-direction, the first floating body (2) is prone to move in the x-direction and hence is prone to vibrate in the x-direction.

The x-displacement of the first floating body (2) is equal to the bend amount of the floating support beams (26a–26d) of the third set with respect to the substrate (1) plus the bend amount of the floating support beams (22a–22d) of the first set. Therefore, in contrast to the case of the first embodiment (FIG. 1), even small amounts of bends of the floating support beams (22a–22d) and (26a–26d) cause the first floating body (2) to move in the x-direction by a long distance. This provides an effect equivalent to an effect that would be obtained by increasing the length of the floating support beams (22a–22d) of the first set in the first embodiment. In spite of this advantage, the total length in the y-direction of the first floating body (2) is not much increased and the first floating body (2) remains compact.

In the second embodiment, the first floating body (2) has movable comb fingers (24a) and (24b) for x-displacement detection. Fixed comb finger electrode wiring lines exist right under the movable comb fingers (24a) and (24b), and are continuous with respective wiring lines (14a) and (14b). Those wiring lines are provided on the insulating layer on the substrate (1). That is, the movable comb fingers (24a) and (24b) and the fixed comb finger electrode wiring lines that are continuous with the wiring lines (14a) and (14b) are parallel plate (capacitor) electrodes that are opposed to each other in the z-direction. When the first floating body (2) is moved in the x-direction, the co-extending area of each parallel plates and the capacitances between the movable comb fingers (24a) and (24b) and the fixed comb finger electrode wiring lines vary. The wiring lines (14a) and (14b) that are continuous with the fixed comb finger electrode wiring lines are connected to a capacitance detection circuit (16), which generates an electrical signal (x-vibration-synchronized signal) representing the capacitance between the first floating body (2) and the wiring lines (14a) and (14b) and supplies it to the x-driving circuit (15) and the signal processing circuit (18).

The other structures and the functions of the second embodiment are the same as those of the first embodiment.

Modifications of Embodiments 1 and 2

Figure 6:
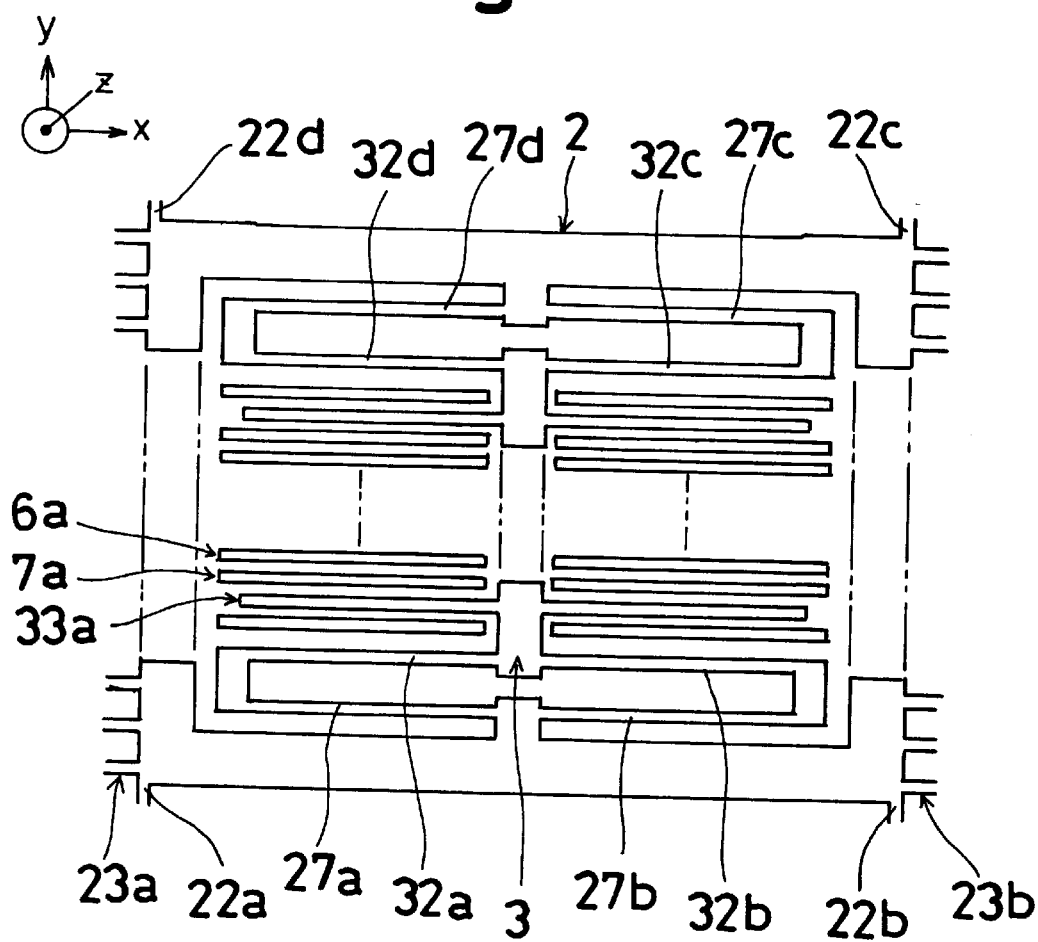
FIG. 6 is an enlarged plan view of a modified portion as a modification to the first or second embodiment.

In the first and second embodiments, the second floating body (3) is supported by the first floating body (2) via the floating support beams (32a–32d) of the second set extending in the x-direction. As shown in FIG. 6, this supporting structure may be modified so that each end portion of the second floating body 3 is supported by ring-like floating support beams (27a, 27b, 32a, and 32b) or (27c, 27d, 32c, and 32d). In this case, when y-directional force is exerted on the second floating body 3 due to, for instance, occurrence of an angular rate, the floating support beams 32a–32d of a second set and the floating support beams 27a–27d of a fourth set are bent in the y-direction and hence the second floating body 3 likely moves in the y-direction. Therefore, in contrast to the cases of the first and second embodiments (FIGS. 1 and 5), even small amounts of bends of the floating support beams (32a–32d) of the second set and the floating support beams (27a–27d) of the fourth set cause the second floating body (3) to move in the y-direction by a large distance. This provides an effect equivalent to an effect that would be obtained by increasing the length of the floating support beams (32a–32d) of the second set in the first and second embodiments.

Embodiment 3

Figure 7:
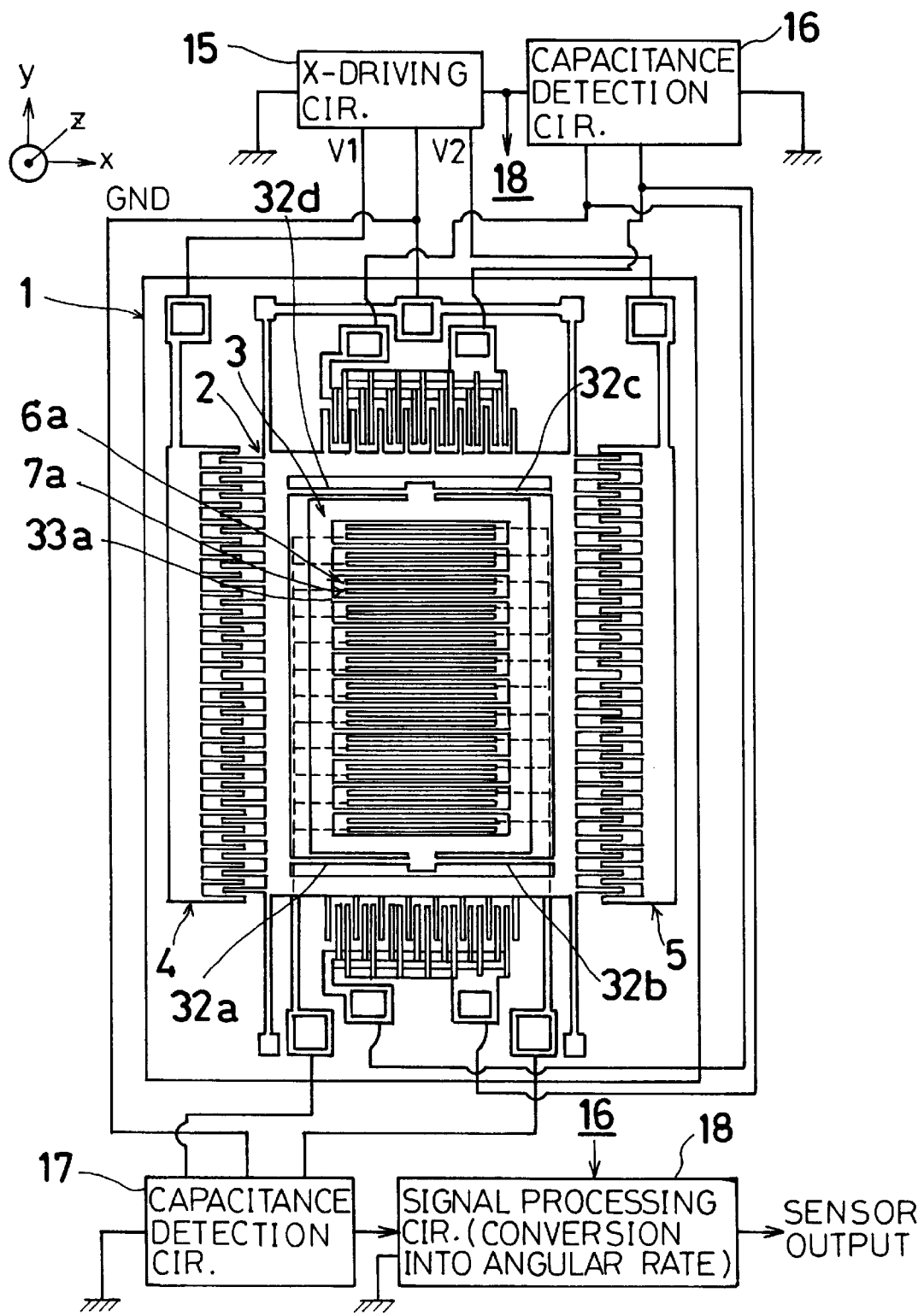
FIG. 7 is a plan view of a third embodiment of the invention.

FIG. 7 shows a third embodiment. In the third embodiment, a second floating body (3) is also shaped like a rectangular ring and is supported, in a floated manner, by the first floating body (2) via floating support beams (32a–32d) of a second set. Each x-axis-extending portion of the second floating body (3) has a protrusion at the center, and each protrusion is continuous with and integral with one ends of the floating support beams (32a) and (32b), or (32c) and (32d). In spite of the fact that the second floating body (3) is shaped like a rectangular ring support beams (32a–32d) of the second set of this embodiment are approximately as long in the x-direction as those of the first and second embodiments. This makes the second floating body (3) more movable in the y-direction. The other structures and functions of the third embodiment are the same as those of the first embodiment shown in FIG. 1.

Embodiment 4

Figure 8:
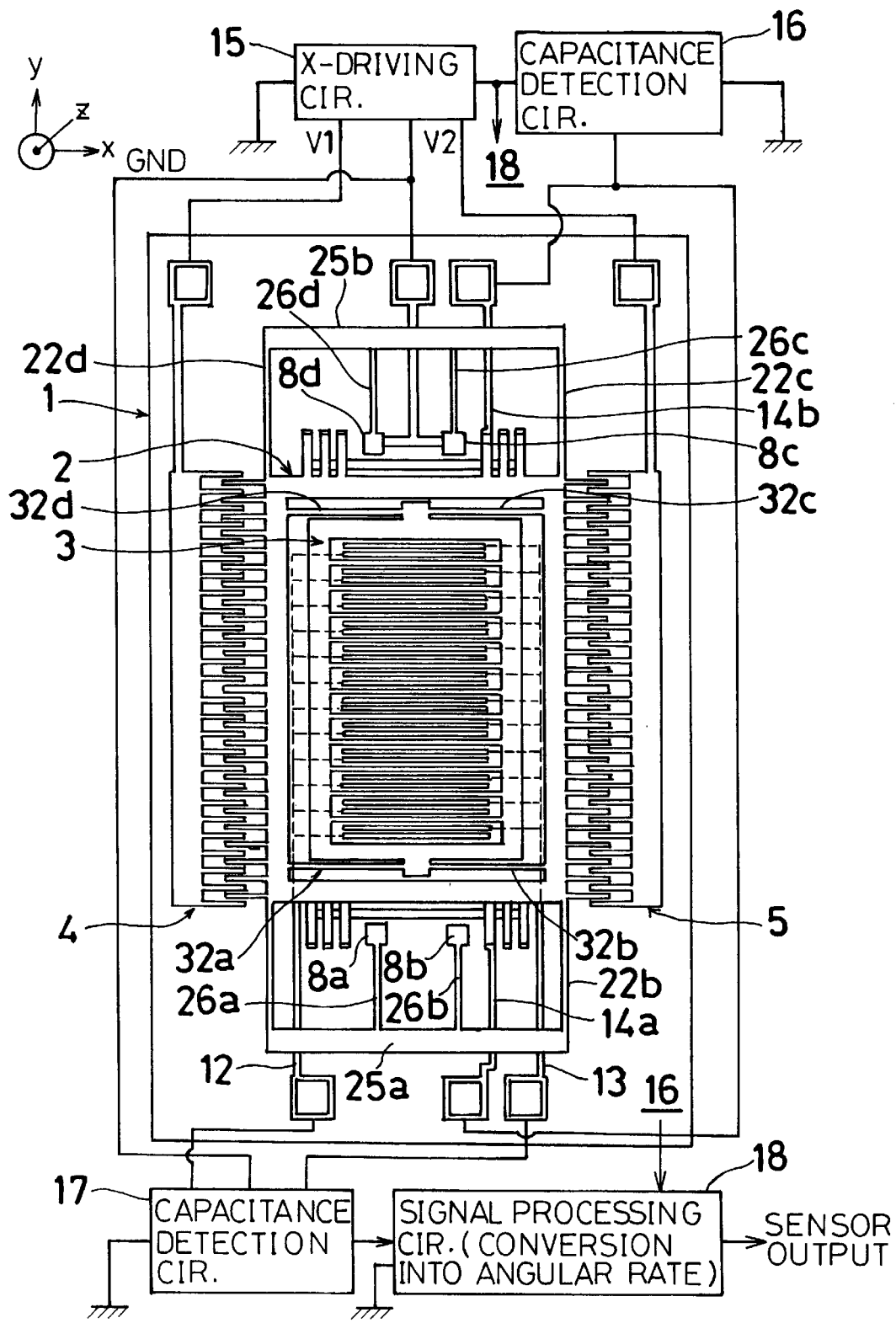
FIG. 8 is a plan view of a fourth embodiment of the invention.

FIG. 8 shows a fourth embodiment. Also in the fourth embodiment, a second floating body (3) is also shaped like a rectangular ring and is supported, in a floated manner, by the first floating body (1) via floating support beams (32a–32d) of a second set. Each x-axis-extending portion of the second floating body (3) has a protrusion at the center, and each protrusion is continuous with and integral with one ends of the floating support beams (32a) and (32b), or (32c) and (32d). In spite of the fact that the second floating body (3) is shaped like a rectangular ring, the support beams (32a–32d) of the second set of this embodiment are approximately as long in the x-direction as those of the first and second embodiments. This makes the second floating body (3) more movable in the y-direction. The other structures and functions of the fourth embodiment are the same as those of the second embodiment shown in FIG. 5.

Modifications of Embodiments 3 and 4

Figure 9:
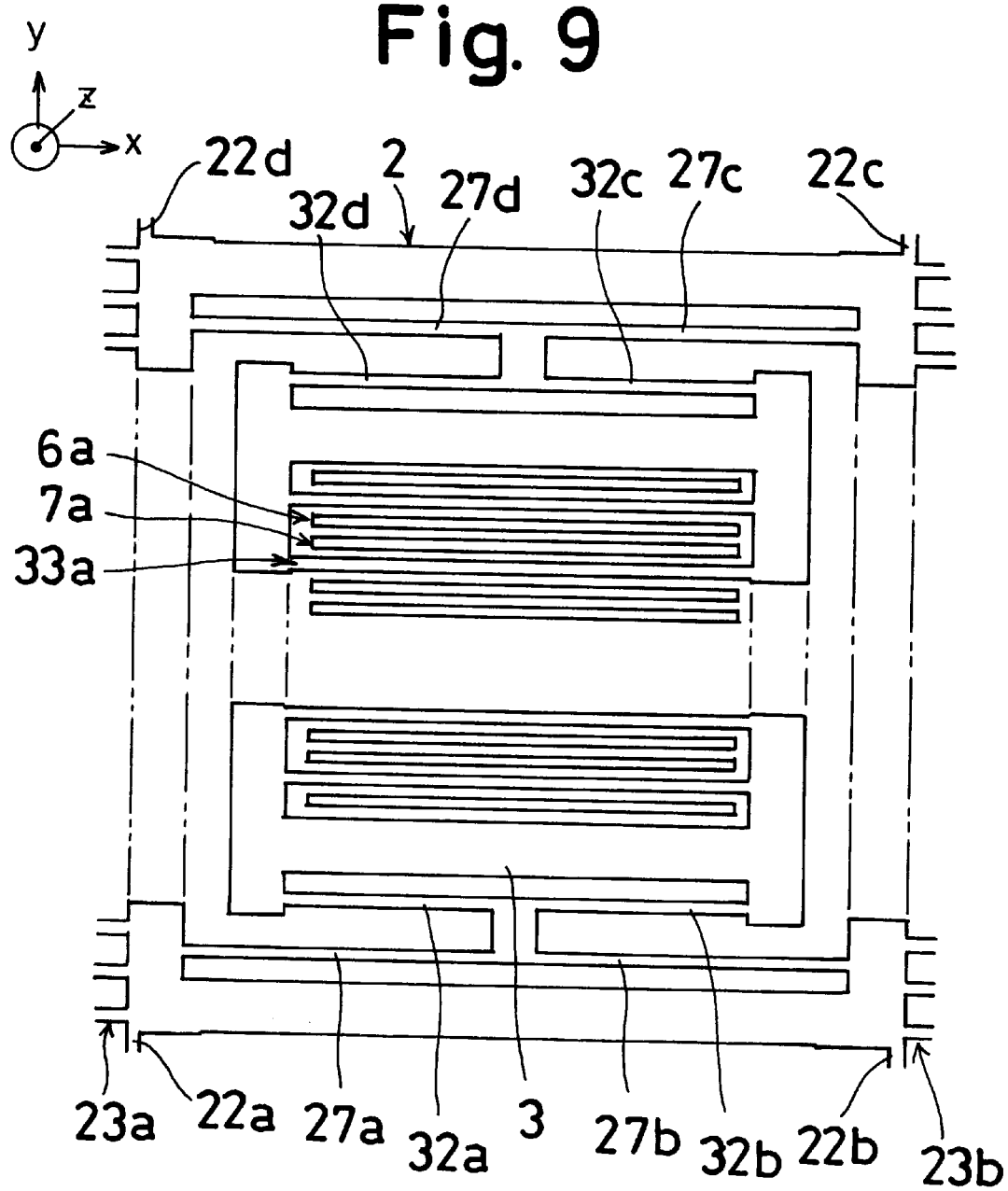
FIG. 9 is an enlarged plan view of a modified portion as a modification to the third or fourth embodiment.

In the third and fourth embodiments, the second floating body (3) is supported by the first floating body (2) via the floating support beams (32a–32d) of the second set extending in the x-direction. As shown in FIG. 9, this supporting structure may be modified so that each end portion of the second floating body (3) is supported by H-shaped floating support beams (27a, 27b, 32a, and 32b) or (27c, 27d, 32c, and 32d). In this case, when y-directional force is exerted on the second floating body (3) due to, for instance, occurrence of an angular rate, the floating support beams (32a–32d) of a second set and the floating support beams (27a–27d) of a fourth set are bent in the y-direction and hence the second floating body (3) likely moves in the y-direction. Therefore, in contrast to the cases of the third and fourth embodiments (FIGS. 7 and 8), even small amounts of bends of the floating support beams (32a–32d) of the second set and the floating support beams (27a–27d) of the fourth set cause the second floating body (3) to move in the y-direction by a large distance. This provides an effect equivalent to an effect that would be obtained by increasing the length of the floating support beams (32a–32d) of the second set in the third and fourth embodiments.

Embodiment 5

Figure 10:
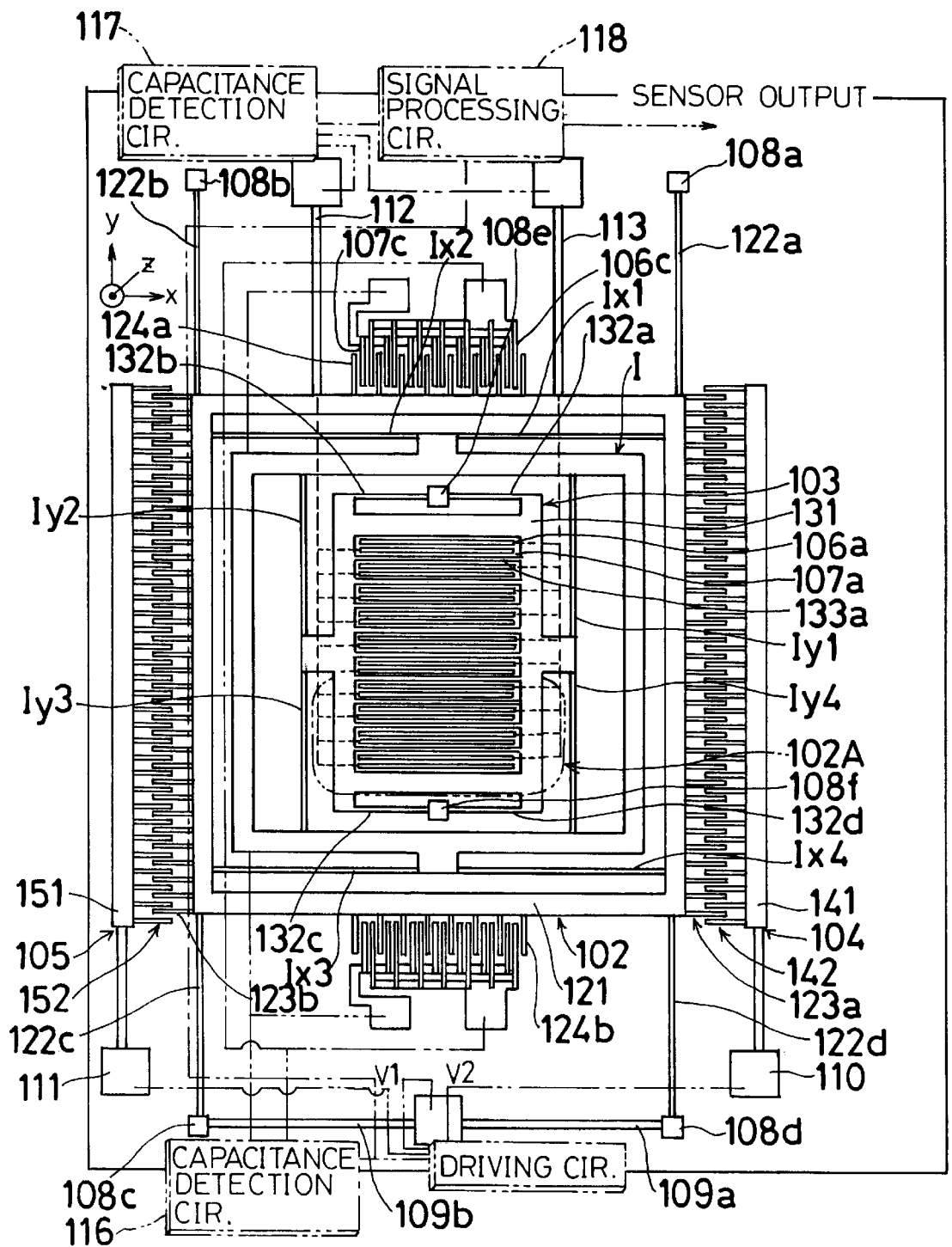
FIG. 10 is a plan view showing a fifth embodiment.

FIG. 10 shows a fifth embodiment according to the invention, that is, an angular rate sensor for detecting an angular rate about the z-axis of a second floating body (103) and a third floating body (I). FIG. 11A is an enlarged view of an end portion of the second floating body (103) shown in FIG. 10. FIG. 11B is a sectional view taken along line 2B—2B in FIG. 11A.

Referring to FIGS. 10 and 11A–11B, floating body anchors (108a–108f), electrode pads (110) and (111) for fixed electrodes, and electrode pads for vibration detection electrodes, all of which are made of polysilicon containing an impurity for imparting conductivity (hereinafter referred to as conductive polysilicon), are joined to a silicon substrate (101) that is formed with an insulating layer. A first floating body (102), the second floating body (103), the third floating body (I), and fixed electrodes (104, 105, 106a–106c, and 107a–107c), all of which are semiconductor thin films made of conductive polysilicon, are connected to connection electrodes via wiring lines (112, 113), etc. that are formed on the insulating layer on the silicon substrate (101). Another configuration is possible in which a substrate having an opposite conductivity type (n-type) to the conductivity type (p-type) of the above-mentioned polysilicon is used as the silicon substrate (101), wiring lines are formed on the silicon substrate )101) by forming pn junctions, and those wiring lines are joined to the floating body anchors (108a–108d), the electrode pads (110) and (111) for the fixed electrodes, and the electrode pads for the connection electrodes.

The floating body anchors (108a–108d) are continuous with respective floating support beams (122a–122d) of a first set extending in the y-direction, which are continuous with the rectangular-ring-like first floating body (102) that is substantially parallel with the surface of the substrate (101).

A plurality of moving-side comb finger electrodes (123a) and (123b) for x-driving, which are arranged in the y-direction at a constant pitch, project from the first floating body (102) leftward and rightward (in the x-direction). The electrode pad (110) for the fixed electrode (104) is continuous with the trunk (141) of the fixed electrode (104), which has fixed comb finger electrodes (142) for x-driving that are inserted in interfinger slots of the moving-side comb finger electrodes (123a). The electrode pad (111) for the fixed electrode (105) is continuous with the trunk (151) of the fixed electrode (105), which has fixed comb finger electrodes (152) for x-driving that are inserted in interfinger slots of the moving-side comb finger electrodes (123b). Very small gaps exist between the moving-side comb finger electrodes (123a) and (123b) for x-driving and the fixed comb finger electrodes (142) and (152) for x-driving.

The first floating body (102) is continuous with floating support beams (Ix1–Ix4) of a third set extending in the x-direction. The floating support beams (Ix1–Ix4) of the third set are continuous with the rectangular-ring-like third floating body (I) that is substantially parallel with the surface of the substrate (101).

The third floating body (I) is continuous with floating support beams (Iy1–Iy4) of a fourth set that are provided in the inner space of the rectangular ring of the third floating body (I) so as to extend in the y-direction. The floating support beams (Iy1–Iy4) are continuous with continuous with the rectangular-ring-like second floating body (103) that is substantially parallel with the surface of the substrate (101).

One ends of the floating support beams (132a–132d) of the second set extending in the x-direction are continuous with and integral with the trunk (131) of the second floating body (103), and the other ends are continuous with the anchors (108) and thereby supported by the substrate (101).

Comb finger electrodes (133a) for y-displacement detection extend from the trunk (131) of the second floating body (103) in the x-direction so as to be parallel with the floating support beams (132a–132d) of the second set, and are arranged in the y-direction. The comb finger electrodes (133a) are arranged in the y-direction at a predetermined pitch. One of the many fixed comb finger electrodes (106a) of a first set for y-displacement detection and one of the many fixed comb finger electrodes (7a) of a second set for y-displacement detection are located in each one-pitch gap of the above arrangement. The fixed comb finger electrodes (106a) of the first set are provided on branches of the wiring line (113) (see FIGS. 11A and 11B) that are formed on the insulating film on the silicon substrate (101), and are at the same electric potential as the wiring line (113). The fixed comb finger electrodes (7a) of the second set are provided on branches of the wiring line (112) (see FIGS. 11A and 11B) that are formed on the insulating film on the silicon substrate (101), and are at the same electric potential as the wiring line (112).

Movable comb finger electrodes (124a) for x-movement detection project in the y-direction from one of the two x-axis-extending portions of the first floating body (102). Comb finger electrodes (106c) of a first set for x-movement detection and comb finger electrodes (107c) of a second set for x-movement detection, which are provided on different wiring lines, are inserted in the interelectrode gaps of the movable comb finger electrodes (124a). Comb finger electrodes similar to the movable comb finger electrodes (124a), the comb finger electrodes (106c) of the first set, and the comb finger electrodes (107c) of the second set are provided for the other x-axis-extending portion of the first floating body (102).

The floating support beams (122a–122d) of the first set, the first floating body (102), the floating support beams (132a–132d) of the second set, the second floating body (103), the floating support beams (Ix1–Ix4) of the third set, the floating support beams (Iy1–Iy4) of the fourth set, the comb fingers (142) and (152) of the fixed electrodes (104) and (105), and the comb finger electrodes (124a), (106c), and (107c) for x-movement detection are separated from the surface of the substrate (101) in the z-direction; that is, they are opposed to the surface of the substrate (101) with gaps in between. They are formed so as to be continuous with and integral with the floating body anchors and the electrode pads for the fixed electrodes after the floating body anchors and the electrode pads for the fixed electrodes have been formed on the surface of the silicon substrate (101) by a micromachining technique. In this specification, a supporting mode in which, as described above, a body is separated from the surface of the substrate (101) in the z-direction and can be displaced or bent in the x and/or y-direction with respect to the substrate (101) is called "floating" or "movable."

The first, second, and third floating bodies (102), (103), and (104) are shaped like a rectangular ring and are symmetrical with respect to their horizontal and vertical center lines, and each of their centers of gravity is located at the intersection of the two diagonals. In a stationary state, the centers of gravity of the first, second, and third floating bodies (102), (103), and (I) are located at the same position. The first, second, and third floating bodies (102), (103), and (I) are shaped and the support beams (122a–122d), (132a–132d), (Ix1–Ix4), and (Iy1–Iy4) are arranged substantially symmetrically with respect to the xz-plane and the yz-plane passing through the centers of gravity.

Since the floating support beams (122a–122d) of the first set for supporting the first floating body (102) are floated above the substrate (101) and extend in the y-direction, they are not bent in the y-direction but are prone to be bent in the x-direction, and hence the first floating body (102) is not prone to vibrate in the y-direction but is prone to vibrate in the x-direction. Since the second floating body (103) is supported by the substrate (101) via the floating support beams (132a–132d) of the second set extending in the x-direction, they are not prone to vibrate in the x-direction but are prone to vibrate in the y-direction. Since the third floating body (I) is continuous with the first floating body (102) via the floating support beams (Ix1–Ix4) of the third set extending in the x-direction, it also vibrates in the x-direction when the first floating body (102) vibrates in the x-direction. And since the third floating body (I) can vibrate also in the y-direction, it vibrates in the y-direction when an angular rate about the z-axis occurs. Since the second floating body (103) is continuous with the third floating body (I) via the floating support beams (Iy1–Iy4) of the fourth set extending in the y-direction, the second floating body (103) also vibrates in the y-direction when the third floating body vibrates in the y-direction. That is, the first floating body (102) can vibrate in the x-direction but cannot vibrate in the y-direction. The second floating body (103) can vibrate in the y-direction but cannot vibrate in the x-direction. The third floating body (I) can vibrate in the y-direction with respect to the first floating body (102) but cannot vibrate in the x-direction. Further, the third floating body (I) can vibrate in the x-direction with respect to the second floating body (103) but cannot vibrate in the y-direction. Therefore, in a state that no angular rate about the z-axis exists, when the first floating body (102) is driven so as to vibrate in the x-direction, the first floating body (102) and the third floating body (I) vibrate in the x-direction but do not vibrate in the y-direction. The second floating body (103) remains stationary. When an angular rate about the z-axis occurs, the third floating body (I) vibrates in the y-direction as well as in the x-direction. As the third floating body (I) vibrates in the y-direction, the second floating body (103) also vibrates in the y-direction.

The first floating body (102) (and the second and third floating bodies 103 and I) is connected to an x-driving circuit (115) via wiring lines (109a) and (109b) on the substrate (101) and is connected to the apparatus ground (GND) there. The fixed electrodes (104) and (105) are connected to the x-driving circuit (115) via electrode conductors on the electrode pads (110) and (111). The x-driving circuit (115) applies high voltages alternately to the fixed electrodes (104) and (105) and repeats this operation. The first floating body (102) (and the third floating body I) is attracted rightward (as viewed in FIG. 1) when a high voltage is applied to the fixed electrode (104) (comb finger electrodes 142) and is attracted leftward when a high voltage is applied to the fixed electrode (105) (comb finger electrodes 152), whereby the first floating body (102) is vibrated in the right-left direction.

When the first floating body (102) is moved rightward, the capacitance between the movable comb finger electrodes (124a) for x-movement detection and the fixed comb finger electrodes (106c) of the first set for x-movement detection decreases, whereas the capacitance between the movable comb finger electrodes (124a) for x-movement detection and the fixed comb finger electrodes (107c) of the second set for x-movement detection increases. When the first floating body (102) is moved leftward, the capacitances vary in opposite ways. The movable comb finger electrodes (124a) are kept at the apparatus ground potential (GND) and the fixed comb finger electrodes (106c) and (107c) are connected to a capacitance detection circuit (116). The capacitance detection circuit (116) generates an electrical signal representing a difference between the capacitance between the electrodes (124a) (kept at the apparatus ground potential GND) and the electrodes (106c) and the capacitance between the electrodes (124a) and the electrodes (107c), and supplies it to the x-driving circuit (115). This electrical signal is an AC signal (hereinafter referred to as an x-vibration-synchronized signal) having a level variation that is synchronized with x-vibration of the first floating body (102). The x-driving circuit (115) switches, between the electrodes (104) and (105), the electrode to which a high voltage is to be applied every time the absolute value of the level of the AC signal reaches a preset value. As a result, the first floating body (102) (and the third floating body I) is vibrated in the x-direction at a predetermined amplitude.

Another driving method is possible in which driving is performed at a resonance frequency though a PLL (phase-locked loop) control using a signal that is obtained by the capacitance detection circuit (116), a drive amplitude is determined by using a signal that is obtained by the capacitance detection circuit (116), and control is made so as to keep the amplitude constant by increasing and decreasing the drive voltage. This enables low-voltage driving.

The movable comb finger electrodes (124a) and the fixed comb finger electrodes (106c) and (107c) may be given the same shape and arranged in the same direction as the driving comb finger electrodes (123), (142), and (152). This enables the drive amplitude to be set at a large value.

When the second floating body (103) is vibrated in the y-direction, the capacitance between the comb finger electrodes (133a) of the second floating body (103) and the fixed comb finger electrodes (106a) increases and decreases, that is, vibrates, and the capacitance between the comb finger electrodes (133a) and the fixed comb finger electrodes (107a) increases and decreases, that is, vibrates, with a phase opposite to the phase of the former capacitance. A capacitance detection circuit (117) generates an electrical signal (y-vibration-synchronized signal) representing a difference between the capacitance between the comb finger electrodes (133a) and the fixed comb finger electrodes (106a) and the capacitance between the comb finger electrodes (133a) and the fixed comb finger electrodes (107a), and supplies it to a signal processing circuit (118). Where the x-vibration of the second floating body (103) is constant, there is a certain relationship between the angular rate and the amplitude of the y-vibration of the second and third floating bodies (103) and (I). Based on this relationship, the signal processing circuit (118) converts the y-vibration-synchronized signal into a signal representing the angular rate (angular rate signal).

Figure 12:
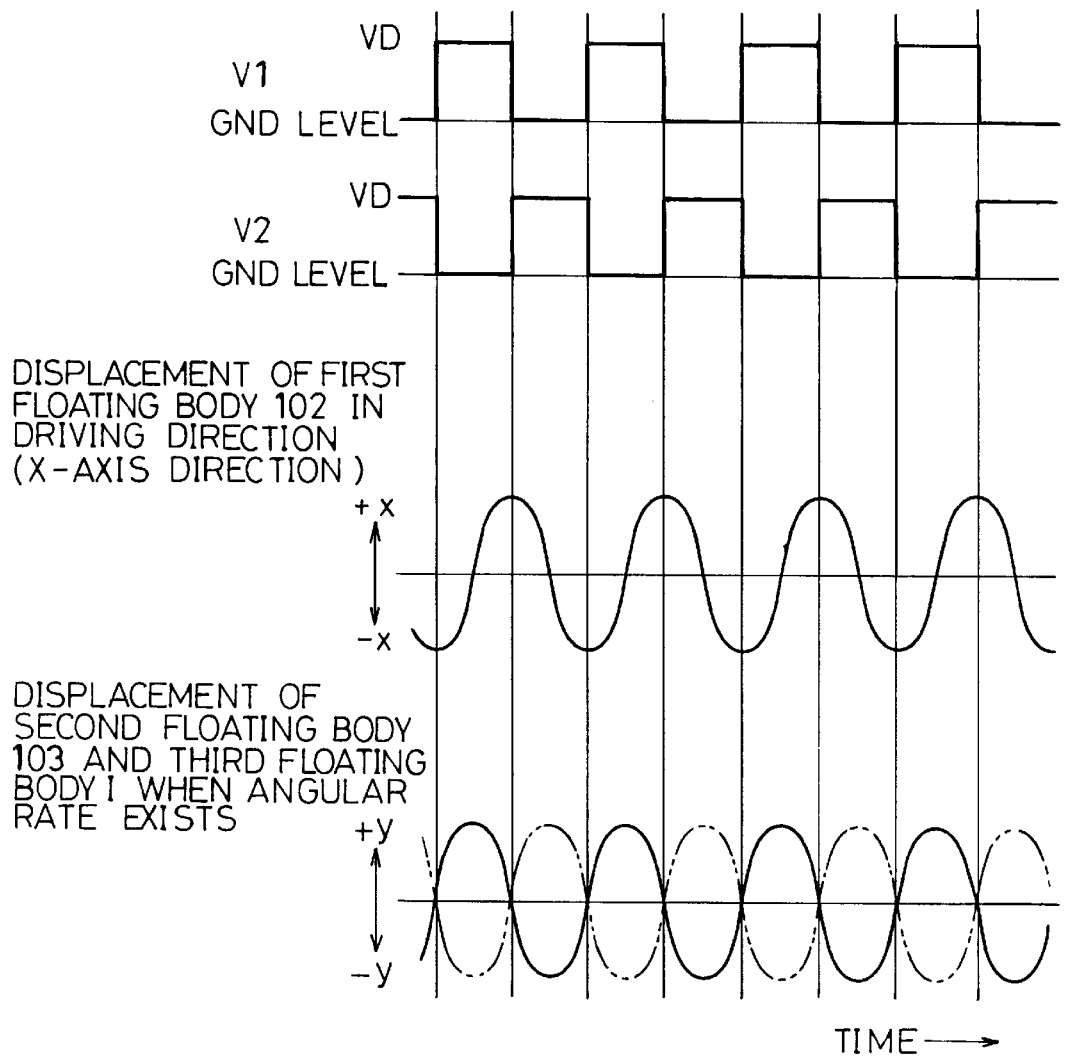
FIG. 12 is a time chart showing waveforms of output voltages of an x-driving circuit 115 shown in FIG. 10, an x-displacement of a first floating body 102, and a y-displacement of a third floating body I and a second floating body 103.

FIG. 12 shows a relationship between voltages (V1) and (V2) that the x-driving circuit (115) applies to the respective fixed electrodes (104) and (105) and x-vibration (displacement in the x-direction) of the first floating body (102) (and the third floating body I), and a relationship between the x-vibration of the first floating body (102) and y-vibration (displacement in the y-direction) of the third floating body (I) and the second floating body (103). They-vibration has one of two phases (corresponding to the respective y-displacement waveforms of a solid line and a two-dot chain line shown in FIG. 12) that are different from each other by 180°, depending on the direction of the angular rate (clockwise or counterclockwise). The signal processing circuit (118) judges the direction of the angular rate (clockwise or counterclockwise) based on a difference of the phase of the y-vibration-synchronized signal from that of the x-vibration- synchronized signal that is supplied from the capacitance detection circuit (116), and outputs a direction signal that represents the judged direction and an angular rate value signal that represents the absolute value of the angular rate corresponding to the amplitude of the y-vibration-synchronized signal.

In the above-described fifth embodiment, electrostatic attractive force in the +y or −y direction tends to be exerted on the movable comb finger electrodes (123a) and (123b) of the first floating body (102) from the fixed comb finger electrodes (142) and (152); that is y-driving force tends to act on the first floating body (102). However, since the first floating body (102) is supported by the floating support beams (122a–122d) of the first set extending in the y-direction, it is prevented from moving in the y-direction by the floating support beams (122a–122d) of the first set; the first floating body (102) is not moved in the y-direction by the x-driving voltages (V1) and (V2). In this manner, the efficiency of the x-vibration driving of the first floating body (102) (and the third floating body I) is increased and the x-vibration is made stable.

On the other hand, since the third floating body (I) is supported by the first floating body (102) via the floating support beams (Ix1–Ix4) of the third set extending in the x-direction, it is prone to vibrate in the y-direction when an angular rate occurs. Since this y-vibration includes substantially no y-displacement due to the x-driving voltages (V1) and (V2) and the x-vibration is stable as described above, the y-vibration of the third floating body (I) corresponds to only the angular rate. In addition, since the second floating body (103) is continuous with the third floating body (I) via the floating support beams (Iy1–Iy4) of the fourth set and is supported by the substrate (101) via the floating support beams (132a–132d) of the second set extending in the x-direction, the second floating body (103) vibrates in the y-direction in synchronism with only y-directional vibration of the third floating body (I) and does not vibrate in the x-direction. Further, when acceleration in the z-direction is applied, the third floating body (I) is prone to move in the z-direction because it is supported by the first and second floating bodies (102) and (103) via the beams. However, since the second floating body (103) is supported, in a floated manner, by the beams (132a–132d) whose one ends are supported by the anchors (108a) and (108b) on the substrate (101), the second floating body (103) can move in the z-direction but less prone to move in the z-direction than the third floating body (I) because of stronger resistance to z-directional displacement. As a result, the displacement of the second floating body (103) with respect to the fixed electrodes (142) and (152) due to z-directional acceleration is small. Therefore, the angular rate detection signals have large S/N ratios and the detection accuracy is highly stable.

The centers of gravity of the first, second, and third floating bodies (102), (103), and (I) are located substantially at the same position in a stable state, and their shapes and the arrangement of the support beams that are continuous with those floating bodies are substantially symmetrical with respect to the xz-plane and the yz-plane passing through the centers of gravity. Therefore, a driving force and a Coriolis force are applied to the floating bodies (102), (103) and (I) substantially along the lines passing through the centers of gravity, and substantially no rotation moment occurs due to a difference between the positions of the centers of gravity of the respective floating bodies (102), (103), and (I) or an unsymmetrical arrangement of the support beams. Therefore, there occurs substantially no unnecessary vibration and deviations of the vibration directions, whereby the S/N ratio of the angular rate detection is increased.

Embodiment 6

Figure 13:
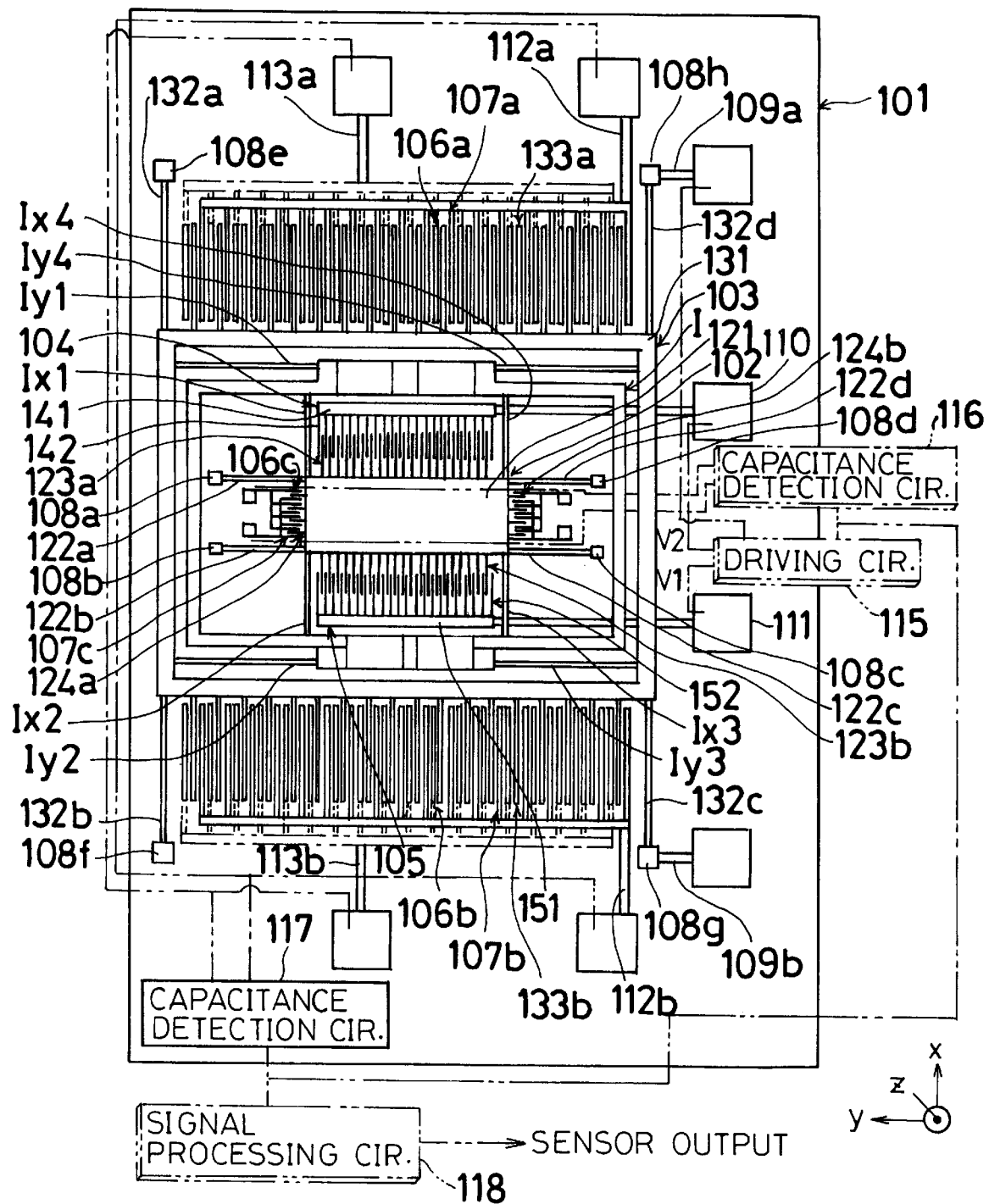
FIG. 13 is a plan view of a sixth embodiment.

FIG. 13 shows a sixth embodiment. In the sixth embodiment, the positions of the second floating body (103) and the first floating body (102) of the fifth embodiment are interchanged; that is, the third floating body (I) is located inside the second floating body (103) and the first floating body (102) is located inside the third floating body (I). In association with these changes, fixed electrodes (104) and (105) for driving the first floating body (102) in the x-direction and electrodes (106c) and (107c) for vibration detection are formed inside the third floating body (I), and two sets of electrodes for y-vibration detection are formed outside the second floating body (103).

Branches (indicated by broken lines), which are continuous with electrode leads (113a) and (113b) for the fixed electrodes for y-vibration detection, are covered with an insulating layer and are joined to the fixed electrodes (106a) and (106b) in regions where the insulating layer is opened. That is, the fixed electrodes (106a) and (106b) are at the same electrical potentials as the electrode leads (113a) and (113b), respectively. Branches that are continuous with electrode leads (112a) and (112b) are jointed to the insulating layer from above, and fixed electrodes (107a) and (107b) are joined to those branches. That is, the fixed electrodes (107a) and (107b) are at the same electric potentials as the electrode leads (112a) and (112b), respectively.

A capacitance detection circuit (117) generates a capacitance detection signal whose level corresponds to a difference between the capacitance between the fixed comb finger electrodes (106a) and (106b) and the comb finger electrodes (133a) and (133b) and the capacitance between the fixed comb finger electrodes (107a) and (107b) and the comb finger electrodes (133a) and (133b), and supplies it to a signal processing circuit (118). The capacitance detection signal represents a level variation that is synchronized with y-vibration of the second floating body (103).

The other structures and functions of the sixth embodiment are the same as those of the fifth embodiment. Since the displacement of the second floating body (103) with respect to the fixed electrodes (142) and (152) due to acceleration in the z-direction, the angular rate detection signals have large S/N ratios. Further, the detection accuracy is highly stable.

Embodiment 7

Figure 14:
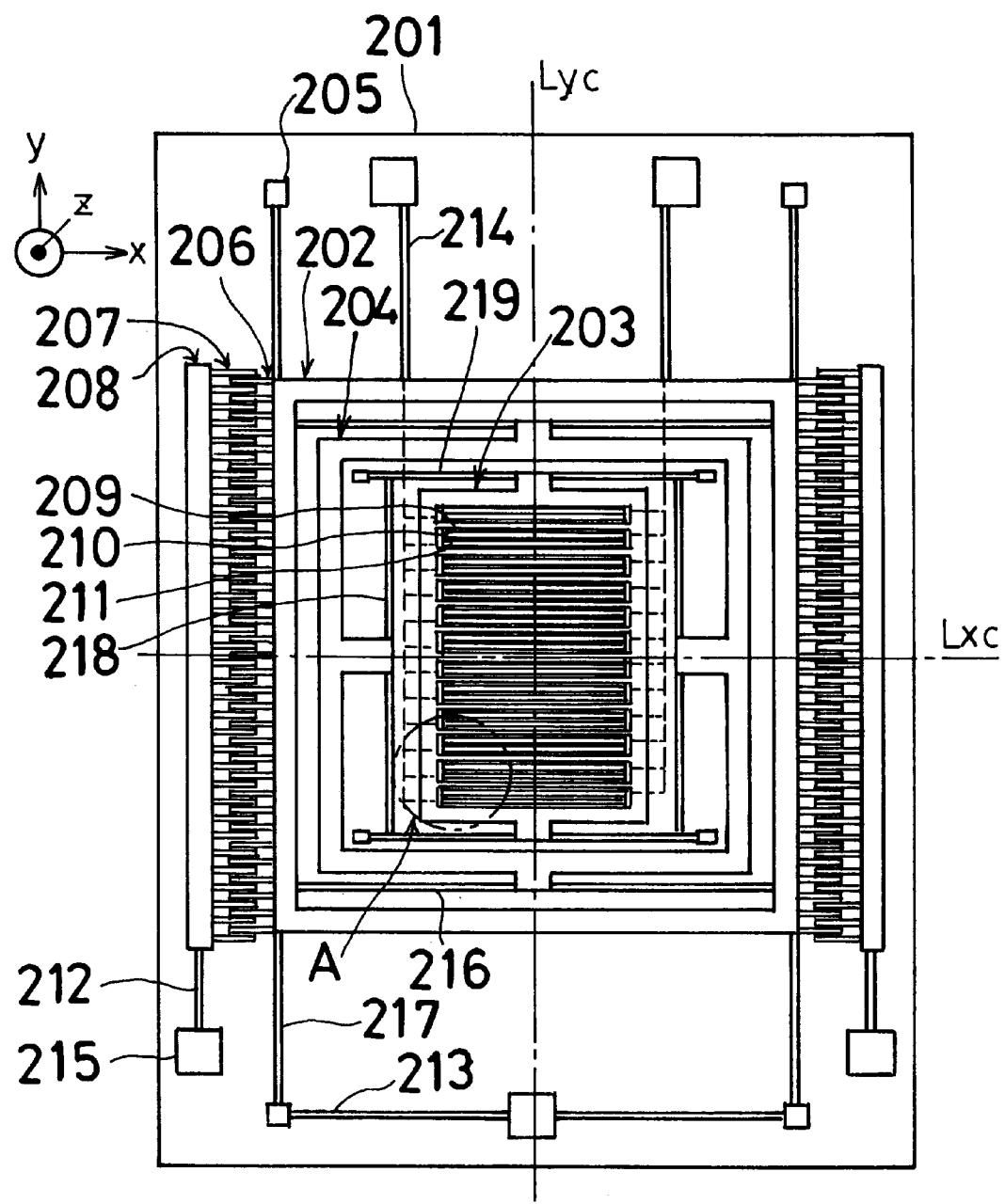
FIG. 14 is a plan view of a seventh embodiment of the invention.
Figure 15:
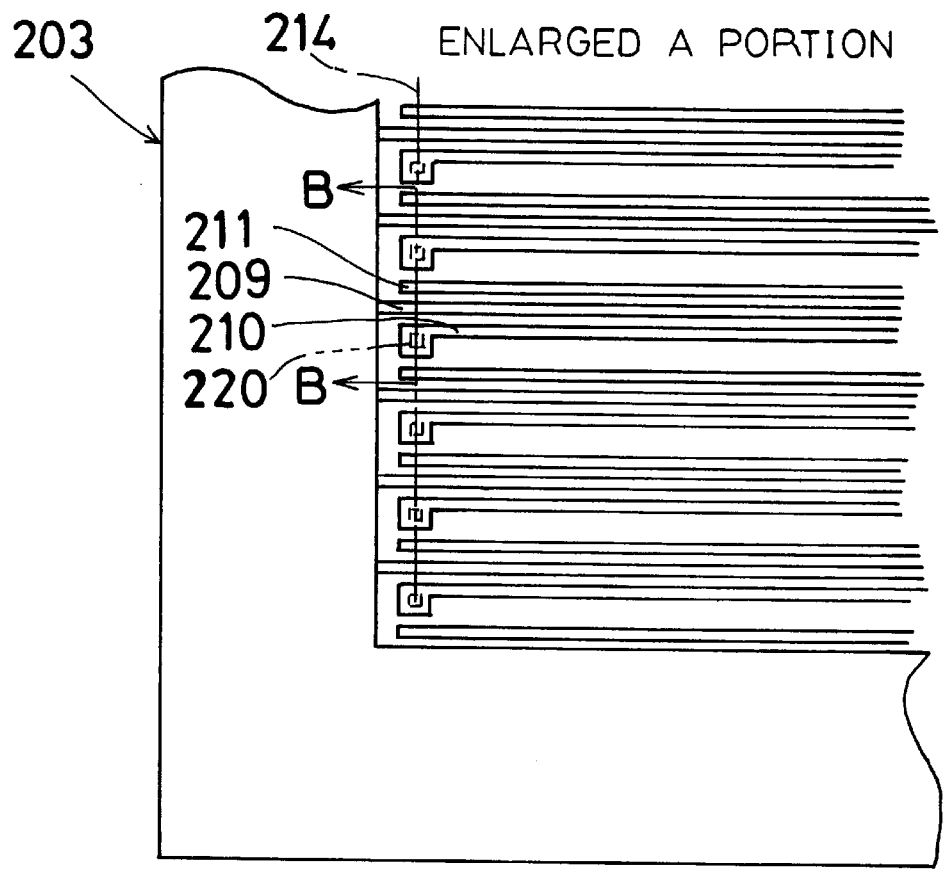
FIG. 15 is an enlarged plan view of a corner portion A of a second floating body 203 shown in FIG. 14.
Figure 16:
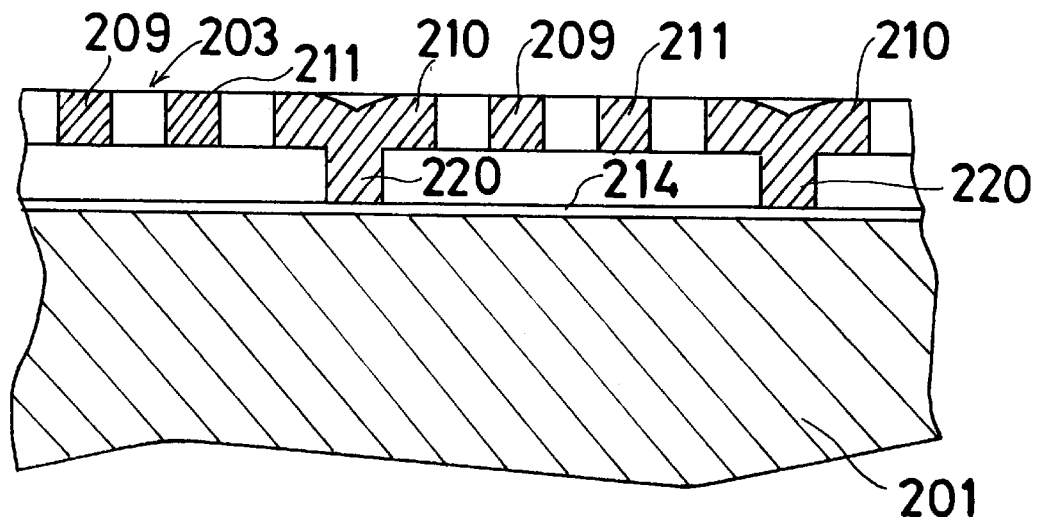
FIG. 16 is an enlarged sectional view taken along line 16—16 in FIG. 15.

FIG. 14 shows a seventh embodiment according to the invention, that is, an angular rate sensor for detecting an angular rate about the z-axis of a third floating body (204). FIG. 15 is an enlarged view of a corner portion A of the second floating body 203 shown in FIG. 14. FIG. 16 is a sectional view taken along line B—B in FIG. 15.

Referring to FIGS. 14–16, floating body anchors (205) (eight small-square regions) and electrode pads (215) (five large-square regions) for fixed electrodes and vibration detection electrodes, all of which are made of polysilicon containing an impurity for imparting conductivity (hereinafter referred to as conductive polysilicon), are joined to a silicon substrate (201) that is formed with an insulating layer. A first floating body (202), the second floating body (203), the third floating body (204), two fixed electrodes (208), and fixed electrodes (210) and (211), all of which are semiconductor thin films made of conductive polysilicon, are connected to electrode pads (215) via wiring lines (212–214) that are formed on the insulating layer on the silicon substrate (201). Another configuration is possible in which a substrate having an opposite conductivity type (n-type) to the conductivity type (p-type) of the above-mentioned polysilicon is used as the silicon substrate (201), wiring lines are formed on the silicon substrate (201) by forming pn junctions, and the wiring lines (212–214) are joined to the floating body anchors (205) and the electrode pads (215) for the fixed electrodes.

The first to third floating bodies (202–204) have a common central axis (Lxc) that is parallel with the x-axis and a common central axis (Lyc) that is parallel with the y-axis. In a stationary state, their centers of gravity are located at the same position, that is, at the intersection of the central axes (Lxc) and (Lyc). The floating bodies (202–204) are symmetrical with respect to the central axes (Lxc) and (Lyc). Therefore, the first to third floating bodies (202–204), the fixed electrodes (208), (210) and (211), and various beams (described later) will be described with attention paid to their portions on the right of the central axis (Lyc) (i.e., right-half portions).

The first floating body (202) is continuous with and integral with first beams (21) (four beams that are arranged so as to have the above-mentioned center of gravity as the point of symmetry) extending in the y-direction. End portions of the beams (217) are continuous with the respective floating body anchors (205). The first floating body (202) is thus supported by the floating body anchors (205) via the beams (217) so as to float above the substrate (201). Extending in the y-direction, the beams (217) are not bent in the y-direction but are prone to be bent in the x-direction. Therefore, the first floating body (202) cannot move in the y-direction and can move in the x-direction.

The second floating body (203) is continuous with and integral with first beams (219) (four beams that are arranged so as to have the above-mentioned center of gravity as the point of symmetry) extending in the x-direction. End portions of the beams (219) are continuous with the respective floating body anchors. The second floating body (203) is thus supported by the floating body anchors via the beams (219) so as to float above the substrate (201). Extending in the x-direction, the beams (219) are not bent in the x-direction but are prone to be bent in the y-direction. Therefore, the second floating body (203) cannot move in the x-direction and can move in the y-direction.

The third floating body (204) is continuous with and integral with third beams (216) (four beams that are arranged so as to have the above-mentioned center of gravity as the point of symmetry) extending in the x-direction. End portions of the beams (216) are continuous with the first floating body (202). Extending in the x-direction, the beams (216) are not bent in the x-direction but are prone to be bent in the y-direction. Therefore, the third floating body (204) cannot move in the x-direction with respect to the first floating body (202); the third floating body (204) also moves in the x-direction as the first floating body (202) moves in the x-direction. But the third floating body (204) can move in the y-direction. That is, although the first floating body cannot move in the y-direction, the third floating body can move in the y-direction.

Fourth beams (218) (four beams that are arranged so as to have the above-mentioned center of gravity as the point of symmetry) extend in the y-direction. One end of each of the fourth beams (218) is continuous with and integral with the third floating body (204), and the other ends are continuous with the respective second beams (219). In other words, the fourth beams (218) branch off, so as to extend in the y-direction, from the respective second beams (219) extending in the x-direction, and are continuous with the third floating body (204).

A plurality of moving-side comb finger electrodes (206) for x-driving, which are arranged in the y-direction at a constant pitch, project from the first floating body (202) leftward and rightward (in the x-direction). Each fixed electrode (208) has fixed comb finger electrodes (207) for x-driving that are inserted in interfinger slots of the moving-side comb finger electrodes (206). Very small gaps exist between the moving-side comb finger electrodes (206) for x-driving and the fixed comb finger electrodes (207) for x-driving.

Electrodes (209) for y-displacement detection extending from the second floating body (203) in the x-direction are arranged in the y-direction at a predetermined pitch. One of the many fixed electrodes (210) of a first set for y-displacement detection and one of the many fixed electrodes (211) of a second set for y-displacement detection are located in each one-pitch gap of the above arrangement.

Referring to FIGS. 15 and 16, the fixed electrodes (210) of the first set are provided on the wiring line (214) that are formed on the insulating film on the silicon substrate (201). The fixed electrodes (210) of the first set are electrically continuous, via stems (220), with the wiring line (214) that is formed on the insulating film on the silicon substrate (201), and hence are at the same electric potential as the wiring line (214). The fixed electrodes (211) of the second set are provided on the wiring line that are formed on the insulating film on the silicon substrate (101) so as to be parallel with the wiring line (214).

The first, second, and third floating bodies (202), (203), and (204) are generally shaped like a rectangular ring and are symmetrical with respect to the center axes (Lxc) and (Lyc). In a stationary state, their centers of gravity are located at the intersection of the center axes (Lxc) and (Lyc) and hence are located at the same position. The first to fourth floating support beams (216–219), each group consisting of four beams, are arranged substantially symmetrically with respect to the xz-plane and the yz-plane passing through the centers of gravity.

As described above, the first floating body (202) can vibrate in the x-direction but cannot vibrate in the y-direction. The second floating body (203) can vibrate in the y-direction but cannot vibrate in the x-direction. The third floating body (204) can vibrate in the y-direction with respect to the first floating body (202) but cannot vibrate in the x-direction. Further, the third floating body (204) can vibrate in both of the x-direction and the y-direction with respect to the second floating body (203). Therefore, in a state that no angular rate about the z-axis exists, when the first floating body (202) is driven so as to vibrate in the x-direction, the first floating body (202) and the third floating body (204) vibrate in the x-direction but do not vibrate in the y-direction. The second floating body (103) remains stationary. When an angular rate about the z-axis occurs, the third floating body (204) vibrates in the y-direction as well as in the x-direction. The y-directional vibration of the third floating body (204) is amplified by a leverage operation in which the connecting points of the fourth beams (218) and the second beams (219) serve as points of action of driving forces, the anchors that are continuous with the second beams (219) as supporting points, and the connecting points of the second beams (219) and the second floating body (203) as swinging ends. In this manner, the second floating body (203) is strongly driven in the y-direction and is thereby vibrated in the y-direction.

Figure 17:
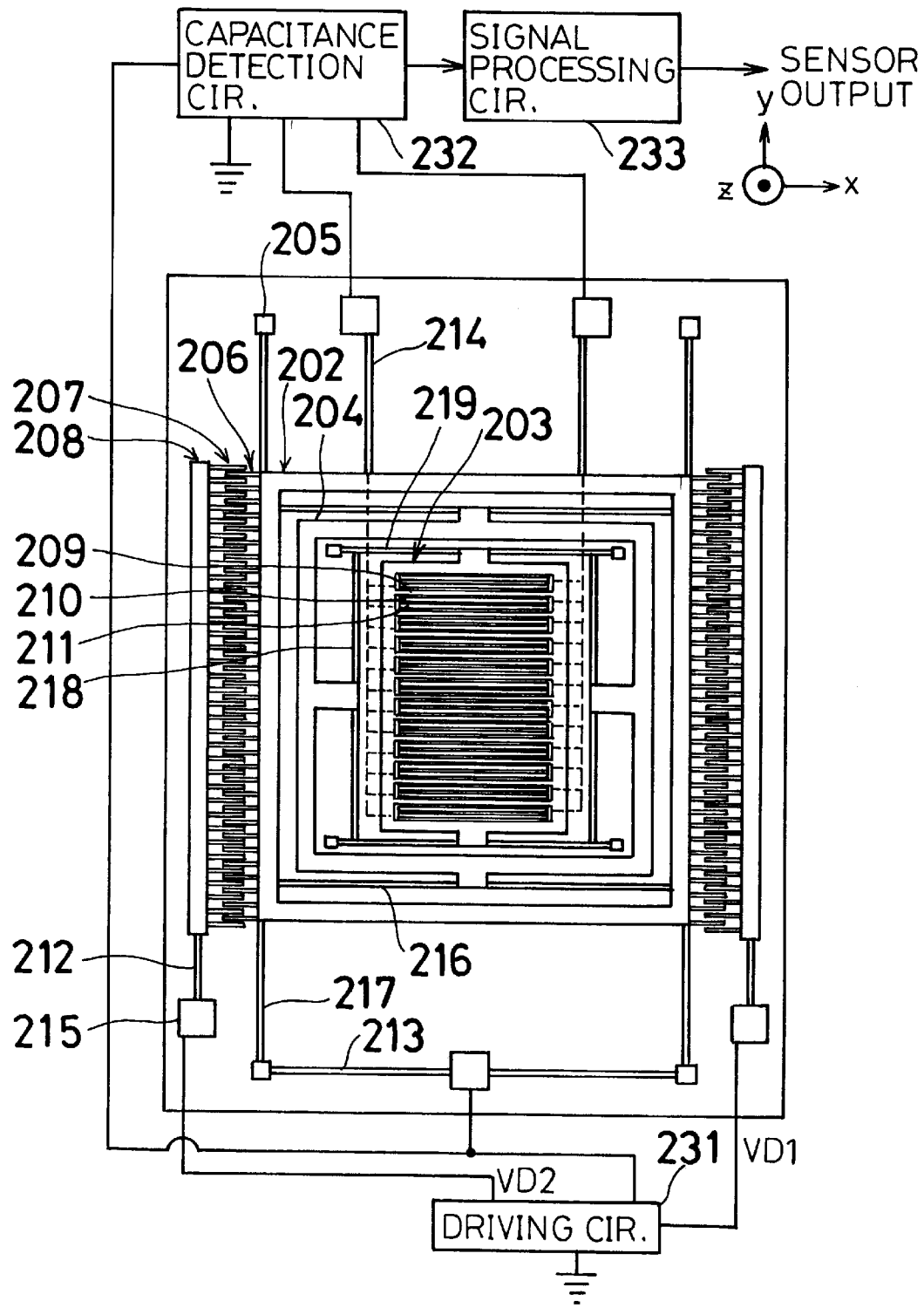
FIG. 17 is a block diagram outlining an angular rate detection circuit system that is connected to the angular rate sensor of FIG. 14.

FIG. 17 outlines an angular rate detection circuit system that is connected to the angular rate sensor of FIG. 14. The first floating body (202) (and the second and third floating bodies 203 and 204) is connected to an x-driving circuit (231) and is connected to the apparatus ground (GND) there. The two fixed electrodes (208) are connected to the x-driving circuit (231). The x-driving circuit (231) applies rectangular voltages alternately to the two fixed electrodes (208) and repeats this operation. The first floating body (202) (and the third floating body 204) is attracted rightward when a rectangular voltage is applied to one of the fixed electrodes (208) and is attracted leftward when a rectangular voltage is applied to the other fixed electrode (208), lo whereby the first floating body (202) is vibrated in the right-left direction.

When an angular rate about the z-axis occurs in the third floating body (204) and the third floating body is thereby vibrated in the y-direction, the second floating body (103) is vibrated in the y-direction. Accordingly, the capacitance between the electrodes (209) of the second floating body (203) and the fixed electrodes (210) increases and decreases, that is, vibrates, and the capacitance between the electrodes (209) and the fixed electrodes (211) increases and decreases, that is, vibrates, with a phase opposite to the phase of the former capacitance. A capacitance detection circuit (232) generates an electrical signal (y-vibration-synchronized signal) representing a difference between the capacitance between the electrodes (209) and the fixed electrodes (210) and the capacitance between the electrodes (209) and the fixed electrodes (211), and supplies it to a signal processing circuit (233). Where the x-vibration of the second floating body (203) is constant, there is a certain relationship between the angular rate and the amplitude of the y-vibration of the second and third floating body (203) (and the third floating body 204). Based on this relationship, the signal processing circuit (233) converts the y-vibration-synchronized signal into a signal representing the angular rate (angular rate signal).

Figure 18:
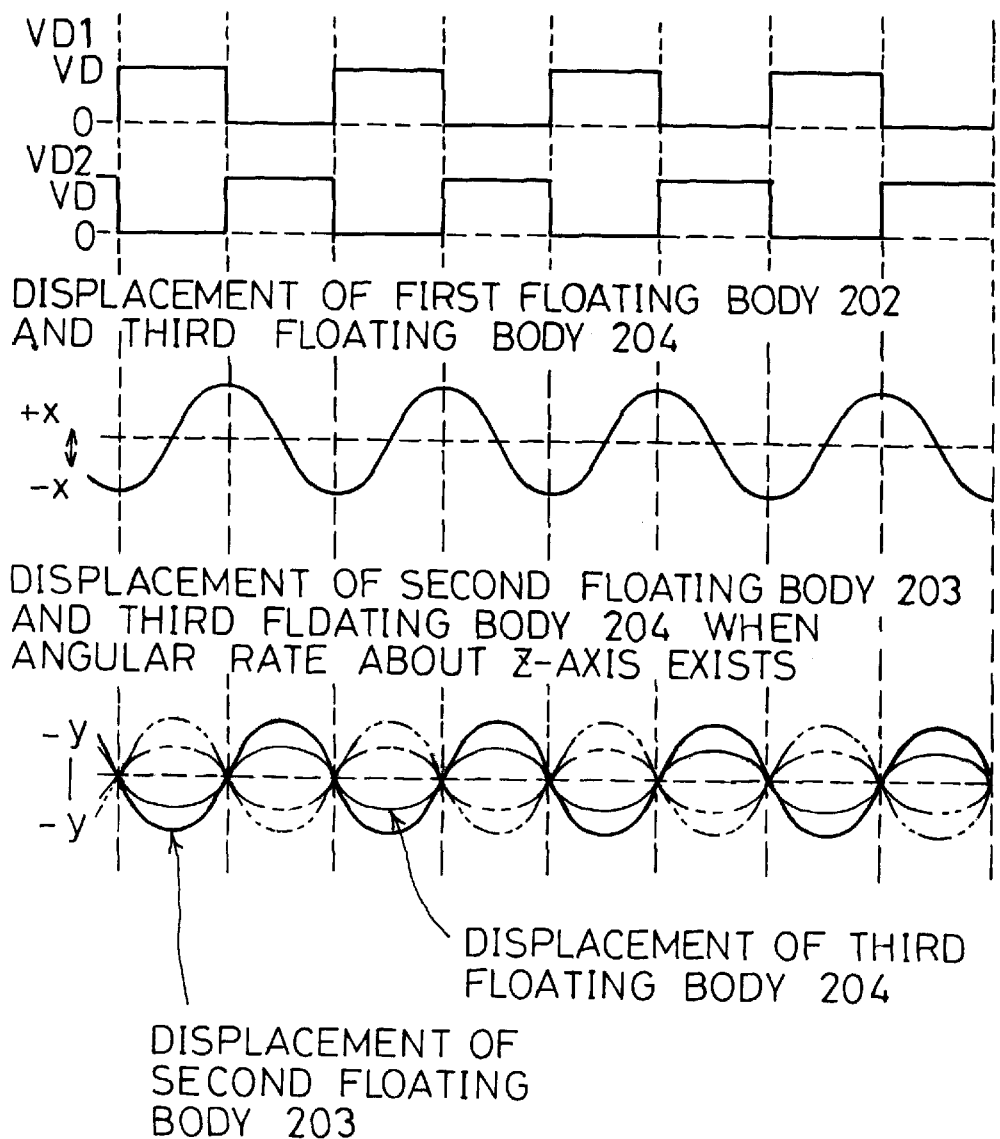
FIG. 18 is a time chart showing waveforms of output voltages of an x-driving circuit (231) shown in FIG. 17, an x-displacement of a first floating body (202), and a y-displacement of a second floating body (203) and a third floating body (204)

FIG. 18 shows a relationship between voltages (VD1) and (VD2) that the x-driving circuit (231) applies to the respective fixed electrodes (204) and (205) and x-vibration (displacement in the x-direction) of the first floating body (202) (and the third floating body 204), and a relationship between the x-vibration of the first floating body (202) and y-vibration (displacement in the y-direction) of the third floating body (204) and the second floating body (203). The y-vibration has one of two phases (corresponding to the respective y-displacement waveforms of a solid line and a two-dot chain line shown in FIG. 18) that are different from each other by 180°, depending on the direction of the angular rate (clockwise or counterclockwise). The signal processing circuit (233) judges the direction of the angular rate (clockwise or counterclockwise) based on a difference of the phase of the y-vibration-synchronized signal from that of the x-vibration-synchronized signal that is supplied from the capacitance detection circuit (232), and outputs a direction signal that represents the judged direction and an angular rate value signal that represents the absolute value of the angular rate corresponding to the amplitude of the y-vibration-synchronized signal.

Figure 19:
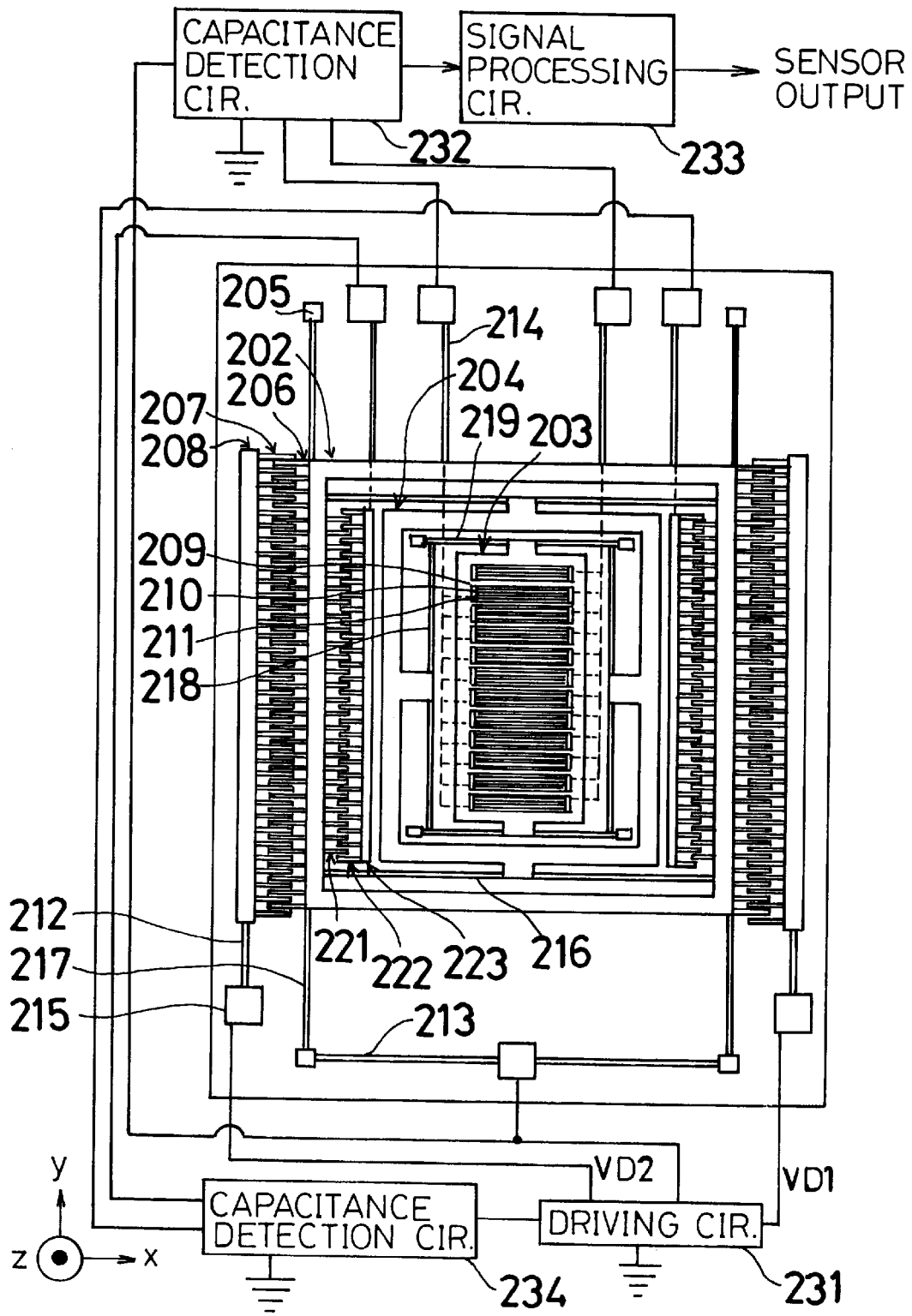
FIG. 19 includes a plan view showing a modification of the angular rate sensor of FIG. 14 and a block diagram of a modification of the angular rate detection circuit system shown in FIG. 17.

FIG. 19 shows a modification of the angular rate sensor in which modification x-vibration feedback electrodes are added. In this modification, a plurality of movable comb finger electrodes (221) for x-displacement detection (the first set projects from the left sideline of the floating body (202) and the second set projects from its right sideline), which are arranged in the y-direction at a constant pitch, project leftward and rightward (in the x-direction) from the first floating body (202) that is driven in the x-direction. Each of the two fixed electrodes (223) (the first one extends along the left sideline of the floating body (202) and the second one extend along its right sideline) has fixed comb finger electrodes (222) for x-displacement detection that are inserted in interfinger slots of the movable comb finger electrodes (221). Very small gaps exist between the movable comb finger electrodes (221) for x-displacement detection and the fixed comb finger electrodes (222) for x-displacement detection.

When the first floating body (202) is moved rightward, the capacitance between the movable comb finger electrodes (221) of the first set for x-displacement detection and the fixed comb finger electrodes (222) of the first set for x-displacement detection decreases, whereas the capacitance between the movable comb finger electrodes (221) of the second set for x-displacement detection and the fixed comb finger electrodes (222) of the second set for x-movement detection increases. When the first floating body (202) is moved leftward, the capacitances vary in opposite ways. The movable comb finger electrodes (221) are kept at the apparatus ground potential (GND) and the fixed comb finger electrodes (222) of the first and second sets are connected to a capacitance detection circuit (234). The capacitance detection circuit (234) generates an electrical signal representing a difference between the capacitance between the electrodes (221) (first floating body 202; kept at the apparatus ground potential GND) and the left-hand fixed electrode (223) and the capacitance between the electrodes (221) and the right-hand fixed electrodes (223), and supplies it to the x-driving circuit (231). This electrical signal is an AC signal (hereinafter referred to as an x-vibration-synchronized signal) having a level variation that is synchronized with x-vibration of the first floating body (202). The x-driving circuit (231) switches, between the electrodes (208) (right-hand and left-hand electrodes), the electrode to which a high voltage is to be applied every time the absolute value of the level of the AC signal reaches a preset value. As a result, the first floating body (202) (and the third floating body 204) is vibrated in the x-direction at a predetermined amplitude.

Another driving method is possible in which driving is performed at a resonance frequency though a PLL (phase-locked loop) control using a signal that is obtained by the capacitance detection circuit (234), a drive amplitude is determined by using a signal that is obtained by the capacitance detection circuit (234), and control is made so as to keep the amplitude constant by increasing and decreasing the drive voltage. This enables low-voltage driving in which the x-driving efficiency is high.

In the above-described seventh embodiment, electrostatic attractive force in the +y or −y direction tends to be exerted on the movable comb finger electrodes (206) of the first floating body (202) from the fixed comb finger electrodes (207); that is y-driving force tends to act on the first floating body (202). However, since the first floating body (202) is supported by the first floating support beams (217) extending in the y-direction, it is prevented from moving in the y-direction by the first floating support beams (217); the first floating body (202) is not moved in the y-direction by the x-driving voltages (VD1) and (VD2). In this manner, the efficiency of the x-vibration driving of the first floating body (202) (and the third floating body 204) is increased and the x-vibration is made stable. On the other hand, since the third floating body 204 is supported by the first floating body (202) via the third floating support beams (16) extending in the x-direction, it is prone to vibrate in the y-direction when an angular rate occurs. Since this y-vibration includes substantially no y-displacement due to the x-driving voltages (VD1) and (VD2) and the x-vibration is stable as described above, the y-vibration of the third floating body (204) corresponds to only the angular rate. In addition, since the second floating body (203) is continuous with the third floating body (204) via the fourth floating support beams (218) and the second floating support beams (219) and is supported by the substrate (201) via the second floating support beams (219) extending in the x-direction, the second floating body (203) vibrates in the y-direct ion in synchronism with only y-directional vibration of the third floating body (204) and does not vibrate in the x-direction. Since the fourth floating support beams (218) branch off from the second floating support beams (129) at their halfway points, according to the principle of leverage the second floating body (203) is vibrated in the y-direction in such a manner that y-directional vibration of the third floating body (204) is amplified. Further, when acceleration in the z-direction is applied, the third floating body (204) is prone to move in the z-direction because it is supported, in a floated manner, by the third beams (216) and the fourth beams (218). However, since the second floating body (203) is supported, in a floated manner, by the beams (219) whose one ends are supported by the anchors on the substrate (201), the second floating body (203) can move in the z-direction but less prone to move in the z-direction than the third floating body (204) because of stronger resistance to z-directional displacement. As a result, the displacement of the second floating body (203) with respect to the fixed electrodes (210) and (211) due to z-directional acceleration is small. Therefore, the angular rate detection signals have large S/N ratios and the detection accuracy is highly stable.

The centers of gravity of the first, second, and third floating bodies (202), (203) and (204) are located substantially at the same position in a stable state, and their shapes and the arrangement of the support beams that are continuous with those floating bodies are substantially symmetrical with respect to the xz-plane and the yz-plane passing through the centers of gravity. Therefore, a driving force and a Coriolis force are applied to the floating bodies (202), (203) and (204) substantially along the lines passing through the centers of gravity, and substantially no rotation moment occurs due to a difference between the positions of the centers of gravity of the respective floating bodies (202), (203) and (204) or an unsymmetrical arrangement of the support beams. Therefore, there occurs substantially no unnecessary vibration and deviations of the vibration directions, whereby the S/N ratio of the angular rate detection is increased.

The floating bodies, beams, anchors, electrodes, and wiring lines are formed by a semiconductor micromachining technique from a polycrystalline, single crystal, or amorphous semiconductor film of Si, Ge, SiC, $Si_xGe_{i-x}$ or $Si_xGe_yC_{i-x-y}$ that is given n or p-type conductivity by impurity doping. The substrate (201) is not necessarily limited to a silicon wafer and may be made of polycrystalline, single crystal, or amorphous Si, Ge, SiC, $Si_xGe_{i-x}$ or $Si_xGe_yC_{i-x-y}$.

Embodiment 8

Figure 20:
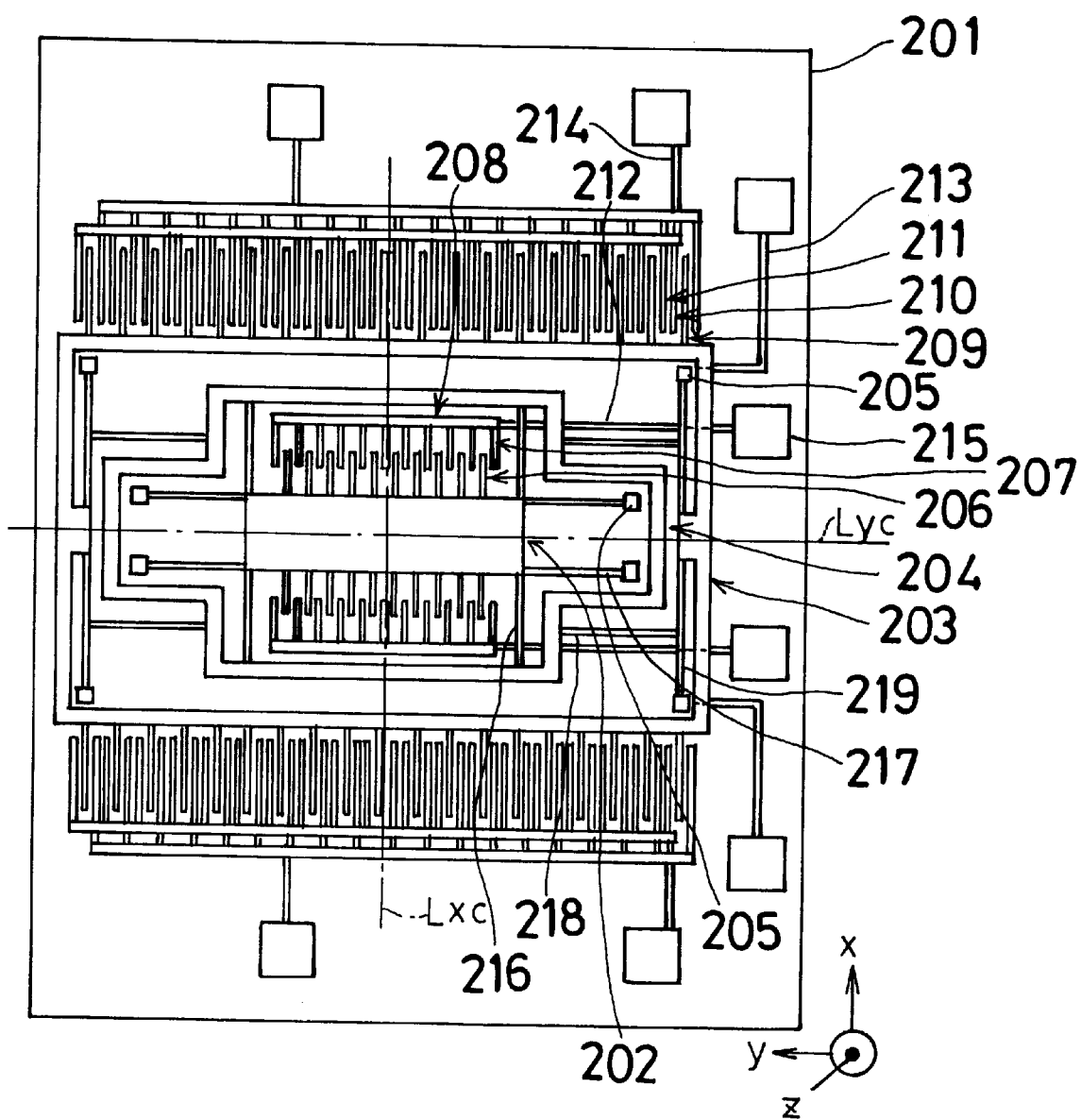
FIG. 20 is a plan view of an eighth embodiment of the invention.

FIG. 20 shows an eighth embodiment. In the eighth embodiment, the positions of the second floating body (203)

and the first floating body (202) of the fifth embodiment are interchanged; that is, the third floating body (204) is located inside the second floating body (203) and the first floating body (202) is located inside the third floating body (204). In association with these changes, fixed electrodes (208) for driving the first floating body (202) in the x-direction are formed inside the third floating body (204), and two sets of electrodes (210) and (211) for y-vibration detection are formed outside the second floating body (203).

Figure 21:
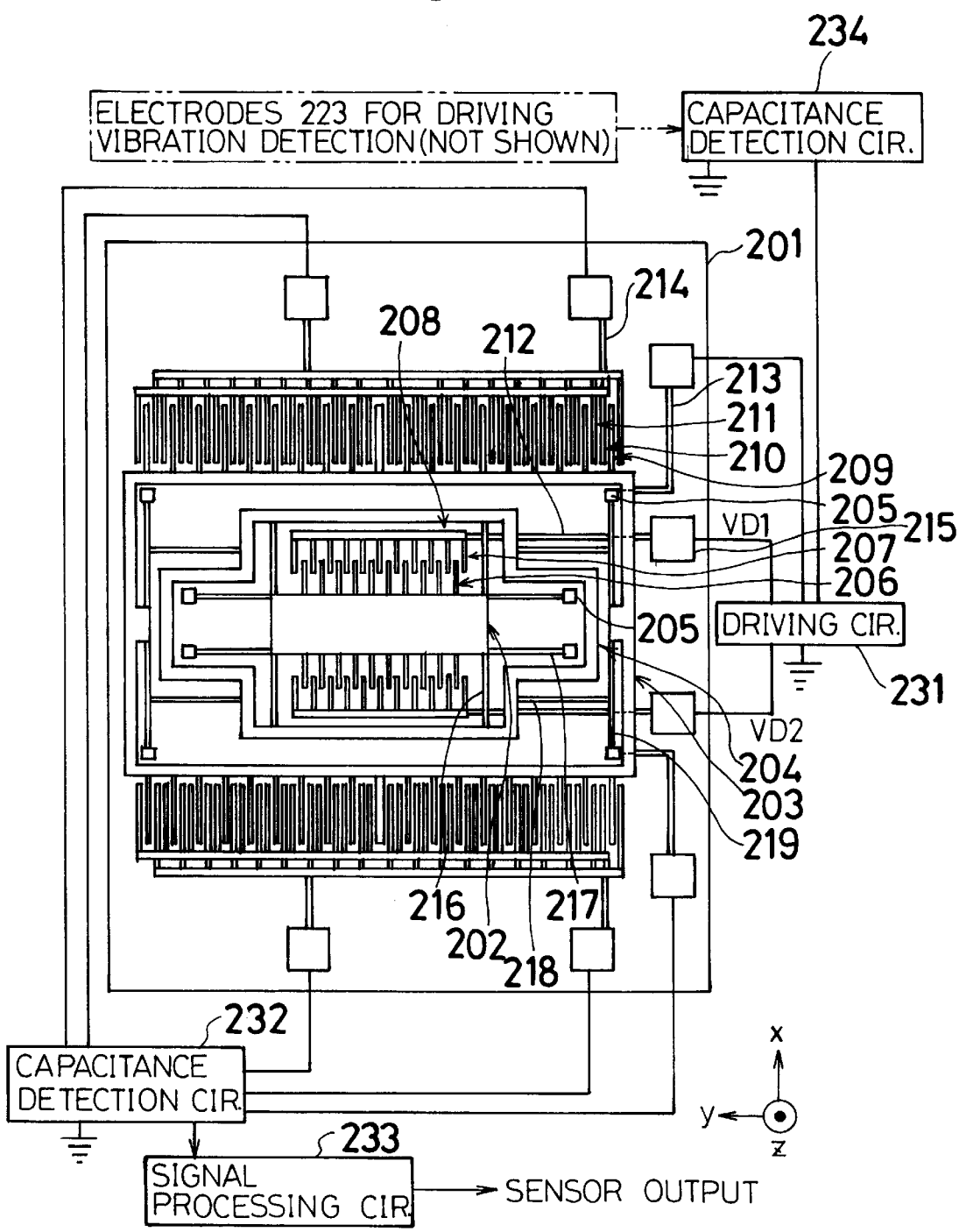
FIG. 21 is a block diagram outlining an angular rate detection circuit system that is connected to the angular rate sensor of FIG. 20.
Figure 22:
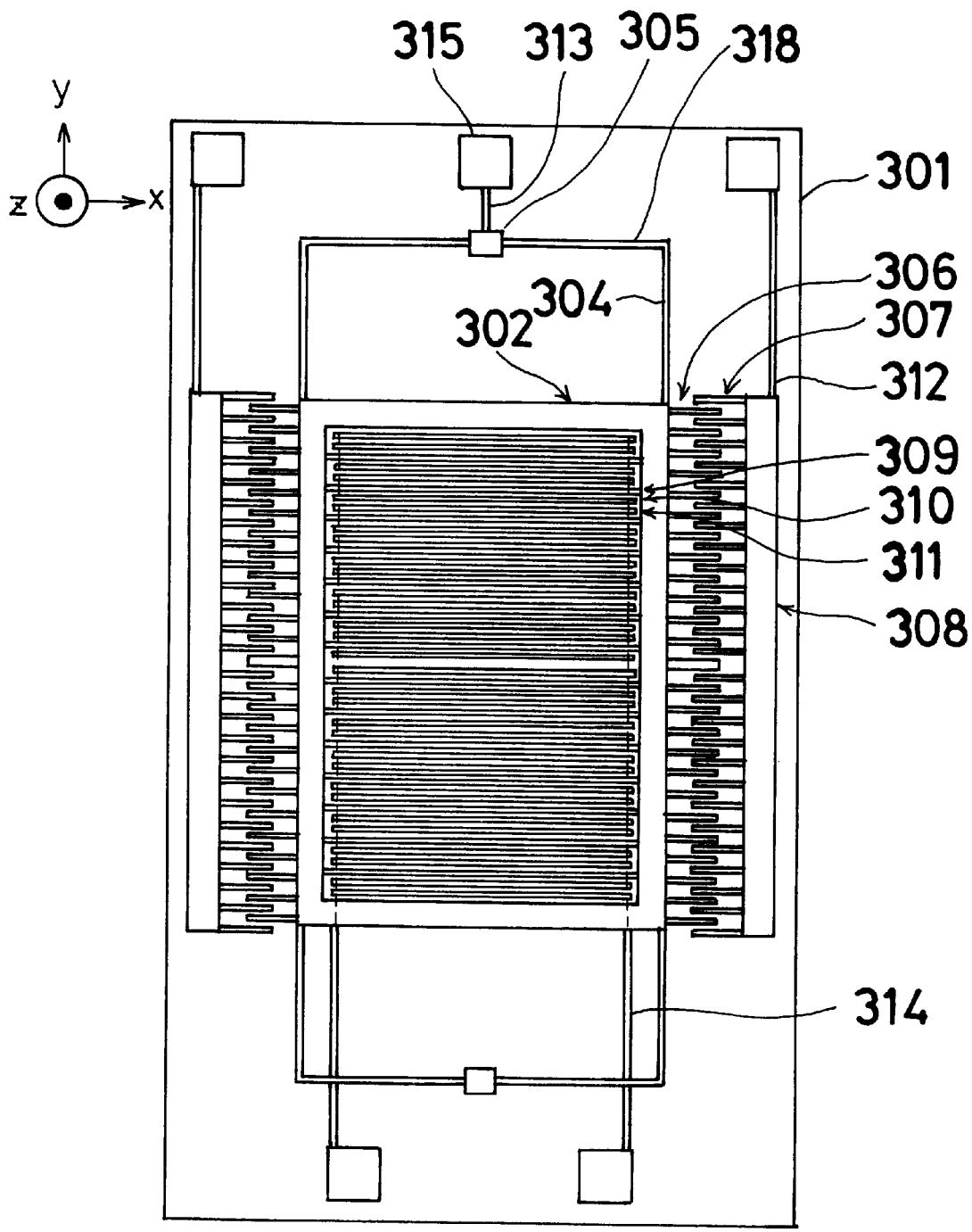
FIG. 22 is a plan view showing an example of a conventional angular rate sensor.

FIG. 21 outlines an angular rate detection circuit system that is connected to the angular rate sensor of FIG. 20. A capacitance detection circuit (232) generates a capacitance detection signal whose level corresponds to a difference between the capacitance between fixed electrodes (210) and movable electrodes (209) and the capacitance between the fixed electrodes (211) and the movable electrodes (209), and supplies it to a signal processing circuit (233). The capacitance detection signal represents a level variation that is synchronized with y-vibration of the second floating body (203).

The other structures and functions of the eighth embodiment are the same as those of the seventh embodiment. Since the displacement of the movable electrodes (209) of the second floating body (203) with respect to the fixed electrodes (210) and (211) due to acceleration in the z-direction, the angular rate detection signals have large S/N ratios. Further, the detection accuracy is highly stable.

In a modification of the eighth embodiment, as in the case of the modification shown in FIG. 19, movable comb finger electrodes for x-displacement detection in the internal space of the rectangular-ring-like first floating body (202) and fixed comb finger electrodes for x-displacement detection are provided on the substrate (201) in the internal space of the first floating body (202). An electrical signal representing the capacitance between those electrodes is generated and supplied to the x-driving circuit (231).

While the preferred embodiments have been described, variations thereto will occur to those skilled in the art within the scope of the present inventive concepts which are delineated by the following claims.

What is claimed is:

1. An angular rate sensor comprising:
    a substrate;
    a first movable body that is supported by the substrate so as to be movable in the x-direction and substantially unmovable in the y-direction;
    a second movable body that is supported by the first movable body so as to be substantially unmovable in the x-direction and movable in the y-direction;
    driving means for vibration-driving the first movable body in the x-direction;
    displacement detecting means for detecting a y-directional displacement of the second movable body, and generating a displacement signal; and
    converting means for converting the displacement signal into an angular rate signal,
    wherein the first movable body has a rectangular ring shape and the displacement detecting means is disposed in an inner space of the first movable body.

2. The angular rate sensor according to claim 1, wherein the first movable body has a rectangular ring shape when projected onto the xy-plane, and wherein centers of gravity of the first and second movable bodies are located substantially at the same position.

3. The angular rate sensor according to claim 2, wherein the first movable body is supported so as to be floated with respect to the substrate by beams that extend in the y-direction and have one ends fixed to the substrate.

4. The angular rate sensor according to claim 3, wherein the second movable body is supported so as to be floated with respect to the substrate by beams that extend in the y-direction and have one ends fixed to the first movable body.

5. An angular rate sensor according to claim 1, wherein the second movable body is disposed in the inner space of the first movable body and has a plurality of cavities in each of which the displacement detecting means is disposed.

6. An angular rate sensor comprising:
    a substrate;
    a first movable body that is supported by the substrate so as to be movable in the x-direction and substantially unmovable in the y-direction;
    a second movable body that is supported by the substrate so as to be movable in the y-direction and substantially unmovable in the x-direction;
    a third movable body that is movable both in the x and y-directions, connected to the first movable body so as to be movable in the y-direction and substantially unmovable in the x-direction with respect to the first movable body, and connected to the second movable body so as to be movable in the x-direction and substantially unmovable in the y-direction with respect to the second movable body;
    driving means for vibration-driving the first movable body in the x-direction;
    displacement detecting means for detecting a y-directional displacement of the second movable body, and generating a displacement signal; and
    converting means for converting the displacement signal into an angular rate signal.

7. The angular rate sensor according to claim 6, wherein the first movable body and the third movable body have a rectangular ring shape when projected onto the xy-plane, wherein the third movable body is located in an internal space of the first movable body and the second movable body is located in an internal space of the third movable body, and wherein centers of gravity of the first, second, and third movable bodies are located substantially at the same position.

8. The angular rate sensor according to claim 6, wherein the second movable body and the third movable body have a rectangular ring shape when projected onto the xy-plane, wherein the third movable body is located in an internal space of the second movable body and the first movable body is located in an internal space of the third movable body, and wherein centers of gravity of the first, second, and third movable bodies are located substantially at the same position.

9. The angular rate sensor according to claim 8, wherein the first movable body is supported so as to be floated with respect to the substrate by beams that extend in the y-direction and have one ends fixed to the substrate.

10. The angular rate sensor according to claim 9, wherein the second movable body is supported so as to be floated with respect to the substrate by beams that extend in the x-direction and have one ends fixed to the substrate.

11. The angular rate sensor according to claim 10, wherein the third movable body is connected to the first movable body via beams extending in the x-direction, and to the second movable body via beams extending in the y-direction.

12. The angular rate sensor according to claim 6, wherein centers of gravity of the first, second, and third movable bodies are located substantially at the same position, and wherein the first, second, and third movable bodies are shaped so as to be substantially symmetrical with respect to an xz-plane and a yz-plane passing through the centers of gravity.

13. An angular rate sensor comprising:

a substrate;

a first movable body that is supported by the substrate via first beams that are movable only in the x-direction so as to be movable in the x-direction and substantially unmovable in the y-direction;

a second movable body that is supported by the substrate via second beams that are movable only in the y-direction so as to be movable in the y-direction and substantially unmovable in the x-direction;

a third movable body that is movable in both the x and y-directions, connected to the first movable body via third beams that are movable only in the y-direction, and connected to fourth beams that branch off from the respective second beams and are movable only in the x-direction with respect to respective branching points;

driving means for vibration-driving the first movable body in the x-direction;

displacement detecting means for detecting a y-directional displacement of the second movable body, and generating a displacement signal; and converting means for converting the displacement signal into an angular rate signal.

14. The angular rate sensor according to claim 13, wherein centers of gravity of movable portions of the first, second, and third movable bodies are located substantially at the same position in the xy-plane in a stationary state.

15. The angular rate sensor according to claim 14, wherein at least one of the first, second, and third movable bodies is symmetrical with respect to an x-axis and a y-axis passing through the centers of gravity in a stationary state, or at least one set of beams of the first, second, third, and fourth beams are symmetrical with respect to an x-axis or a y-axis passing through the centers of gravity of the movable body to which the one set of beams are connected.

16. The angular rate sensor according to claim 15, wherein the first movable body and the first beams are made of a semiconductor thin film and the first beams extend in the y-direction, and the second movable body and the second beams are made of a semiconductor thin film and the second beams extend in the x-direction.

17. The angular rate sensor according to claim 16, wherein the third movable body and the third and fourth beams are made of a semiconductor thin film, and the third beams and fourth beams extend in the x-direction and y-direction, respectively.

* * * * *